US009184915B2

(12) United States Patent
Savtchenko et al.

(10) Patent No.: US 9,184,915 B2
(45) Date of Patent: *Nov. 10, 2015

(54) STRONG AUTHENTICATION TOKEN WITH ACOUSTIC DATA INPUT OVER MULTIPLE CARRIER FREQUENCIES

(75) Inventors: Serguei Konstantinovitch Savtchenko, Eindhoven (NL); Dirk Marien, Ranst (BE)

(73) Assignee: VASCO DATA SECURITY, INC., Oakbrook Terrace, IL (US)

( * ) Notice: Subject to any disclaimer, the term of this patent is extended or adjusted under 35 U.S.C. 154(b) by 485 days.

This patent is subject to a terminal disclaimer.

(21) Appl. No.: 13/599,685

(22) Filed: Aug. 30, 2012

(65) Prior Publication Data

US 2014/0068272 A1    Mar. 6, 2014

(51) Int. Cl.
  *G06F 21/00*    (2013.01)
  *H04L 9/32*    (2006.01)
  *G06F 21/35*    (2013.01)

(52) U.S. Cl.
  CPC .............. *H04L 9/3226* (2013.01); *G06F 21/35* (2013.01); *H04L 9/3234* (2013.01)

(58) Field of Classification Search
  CPC ..... H04L 9/3226; H04L 9/3234; G06F 21/35; G06F 21/00
  USPC .......................................................... 713/185
  See application file for complete search history.

(56) References Cited

U.S. PATENT DOCUMENTS

| 5,136,644 | A | 8/1992 | Audebert et al. |
| 5,668,876 | A | 9/1997 | Falk et al. |
| 2003/0066895 | A1* | 4/2003 | Hikita ................ G06K 19/073 235/492 |
| 2006/0129678 | A1* | 6/2006 | Morita ................ D06F 39/005 709/227 |
| 2009/0141890 | A1* | 6/2009 | Steenstra ........... G06Q 20/3272 380/44 |
| 2011/0241837 | A1* | 10/2011 | Suzuki ................ H01Q 1/2216 340/10.1 |
| 2011/0291811 | A1* | 12/2011 | Nakano ................ H04B 5/0093 340/10.4 |

FOREIGN PATENT DOCUMENTS

| EP | 1 211 841 | 6/2002 |
| EP | 1 788 509 | 5/2007 |
| WO | WO 01/58080 | 8/2001 |
| WO | WO 2005/011191 | 2/2005 |

OTHER PUBLICATIONS

Kuhn, Compromising Emanations Eavesdropping Risks of Computer Displays, Dec. 2003, University of Cambridge, pp. 1-167.*

(Continued)

*Primary Examiner* — Bradley Holder
*Assistant Examiner* — Jenise Jackson
(74) *Attorney, Agent, or Firm* — RatnerPrestia

(57) ABSTRACT

Strong authentication tokens for generating dynamic security values having an acoustical input interface for acoustically receiving input data are disclosed. The tokens may also include an optical interface for receiving input data and may have a selection mechanism to select either the acoustical or the optical input interface to receive data. A communication interface may be provided to communicate with a removable security device such as a smart card and the token may be adapted to generate dynamic security values in cooperation with the removable security device. The acoustic signal received by the token may comprise a plurality of modulated carrier frequencies whereby each carrier frequency has been modulated with a data signal representing the full input data such that the input data are redundantly emitted over more than one modulated carrier frequency.

52 Claims, 8 Drawing Sheets

(56) References Cited

OTHER PUBLICATIONS

Suh et al, Test Token Driven Acoustic Balancing For Sparse Enrollment Data in Cohort GMM Speaker Recognition, Aug. 23-27, 2010, pp. 572-575.*

International Search Report for PCT/US2012/026077 mailed Jun. 6, 2012.

International Search Report for PCT/US2012/026588 mailed Jun. 6, 2012.

* cited by examiner

STRONG AUTHENTICATION TOKEN WITH ACOUSTIC DATA INPUT OVER MULTIPLE CARRIER FREQUENCIES

FIELD OF THE INVENTION

The invention relates to strong authentication tokens for securing remote access to computers and applications and remote transactions over computer networks. More specifically, the invention relates to strong authentication tokens that are adapted to acoustically receive input data.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

In the past, application providers have relied on static passwords to provide the security for remote applications. In recent years it has become evident that static passwords are not sufficient and that more advanced security technology is required.

One way of solving the security problems associated with remote access to computer systems and applications over public networks is provided by a Public Key Infrastructure (PKI). Using a Public Key Infrastructure one associates a public-private key pair with each user. The key pair is associated with a certificate (issued by a trustworthy Certificate Authority) that binds that public-private key pair to a specific user. By means of asymmetric cryptography this public-private key pair can be used to authenticate the user, sign transactions, and set-up encrypted communications.

To guarantee an adequate level of security it is mandatory that each user's private key remains secret and can only be accessed to create a signature or to decrypt a message by the legitimate user associated with that key. It is common to rely on a smart card or a dedicated Universal Serial Bus (USB) device (sometimes referred to as a USB key or a USB token) to store the public-private key pair and the certificate and to carry out the cryptographic calculations involving the private key.

There are some disadvantages associated with PKI and the smart cards carrying the PKI keys and certificates:

1. Building a Public Key Infrastructure is generally complicated and therefore expensive when compared to competing security technologies.
2. PKI is inherently limited to environments and applications where there is a digital connection between clients and servers, because PKI cryptograms and signatures are bulky and not easily transformed into human-readable form. In other words it is unsuitable for telephone banking or other delivery channels where it is not possible to provide a digital connection between the container of the PKI certificate and private key on the one hand and an application server on the other hand.
3. PKI smart cards and USB tokens do not have a built-in power supply or a user interface. PKI smart cards and USB tokens therefore rely on the presence of an interfacing system that provides electrical power to the card, that is capable of digitally exchanging data with the card, and that is capable of interacting with the user (e.g. capturing the card's personal identification number (PIN) and presenting the data that should be signed). USB tokens are usually plugged into a built-in USB port of a PC, where the USB port supplies power to the USB token and the human interface devices connected to the PC provide the user interaction capabilities (connected USB token model). PKI smart cards are usually operated by means of a PC equipped with a simple smart card reader, where the reader only supplies power to the smart card and enables communication between an application on the PC and the inserted smart card, and whereby the human interface devices connected to the PC provide the user interaction capabilities. Such a reader, which has no trustworthy user interface of its own, is often referred to as transparent card reader. These typical usage models reduce the mobility of the user, as most PCs are not pre-equipped with smart card readers, and ad-hoc installation of drivers for the readers of USB tokens proves too cumbersome. It also presents a security problem: all user interaction (such as approving a signature or capturing the card's PIN) is done on the inherently insecure PC.

Another approach consists of adding software applications offering security functions to general purpose devices such as a user's PC, or mobile device (e.g., mobile phone or PDA). The main problem associated with this approach is that general purpose devices have an inherently open architecture which makes them susceptible to all kinds of malicious software such as viruses and Trojans that could present fake messages to the user, or capture whatever the user enters on the keypad, or read in memory sensitive data associated with a security application, or alter data before they are being signed. Therefore general purpose devices cannot be considered to have a trustworthy user interface and don't have secure means to store secrets such as PIN values and cryptographic keys. Furthermore, known solutions for mobile devices rely on wireless subscriber networks for the reception and/or transmission of transaction data. Such networks have inherent security and end point authentication mechanisms in place, which cannot be assumed to be present when the Internet is used for all transmissions.

An alternative technology for authentication and transaction signature capabilities, which avoids the security issues of solutions based on general purpose devices and the security, installation and interconnection problems of PKI smart cards and USB tokens, is offered by 'strong authentication token devices'. Typical examples of strong authentication tokens are the products of the DIGIPASS® line, commercialized by Vasco Data Security Inc. of Chicago, Ill. (see the website http://www.vasco.com). A strong authentication token is an autonomous battery-powered device, dedicated to providing authentication and/or transaction signature functions, usually pocket-size, with its own display and keypad. In some cases the keypad is reduced to a single button or even completely omitted, in other cases the keypad can be a full keyboard. The display and keypad of a typical strong authentication token are non-removable and not user-serviceable, fully controlled by the token, and immune for interference by malicious software on a host computer. Therefore strong authentication tokens are considered to have a trustworthy user interface in contrast to, for example, PCs where there is always the possibility that malicious software such as a virus or a Trojan presents fake messages to the user, or captures whatever the user enters on the keypad, or reads in memory sensitive data associated with a security application (for example secret cryptographic keys), or alters data before they are being signed. The main purpose of a strong authentication token is to generate dynamic security values which are usually referred to as 'One-Time Passwords' (OTPs) or dynamic passwords. Typically these OTPs are generated by cryptographically combining a secret that is shared between the token and a verification server with a dynamic value such as a time value, a counter value or a server challenge that is provided to the token, or a combination of these. Some strong authentication tokens can also use data (such as transaction data) that have been provided to the token as dynamic value or in combination with any of the dynamic values mentioned above to generate a security value. In these cases the resulting security value is meant to indicate the user's approval of the data and the security value is usually referred to as an electronic signature or Message Authentication Code (MAC). Some strong authentication tokens comprise a device with a display and a keypad that is capable of communicating with an inserted smart card whereby the generation of the OTPs or MACs is partly done by the device itself and partly by the inserted smart card.

A typical way to provide data to a strong authentication token is by letting the user enter the data manually on the token's keypad. When the amount of data that has to be entered in this way exceeds a few dozen characters, the process is often perceived by users as too cumbersome. Another disadvantage is that tokens that support manual data input usually have a keypad which usually makes the token considerably larger than it could be if no such keypad were present. To relieve the user, solutions have been devised whereby the input of data doesn't require the manual entry of said data by the user on the token's keypad. One example are solutions whereby the token includes receiving means to receive data sent over an out-of-band channel such as for example a radio network or mobile telephony network (see U.S. Pat. No. 5,668,876 issued on Sep. 16, 1997). The disadvantage of such out-of-band solutions is the extra complexity and cost associated with supporting the technology of said out-of-band channel, and the dependence on the availability and the cost of usage of said out-of-band channel. Another solution consists of tokens that allow for data input by means of an optical interface, whereby the user holds the token close to a computer screen that displays a varying optical pattern. Examples of such optical tokens are Digipass 700 and Digipass 300 offered by VASCO Data Security Inc. of Chicago, Ill. and the tokens described in European Patent Specification Number 1211841 published Jun. 5, 2002, European Patent Specification Number 1788509 published May 23, 2007, U.S. Pat. No. 5,136,644 issued on Aug. 4, 1992.

A general problem of tokens with an optical data input interface is that relatively expensive components are required to build an interface that can take in data at a high data rate. This is a consequence of the requirement to work reliably in a very broad range of computer screen qualities and environmental lighting conditions, combined with the relatively low refresh rates of typical computer screens. Another, more cost-effective, alternative is to use a low-speed optical interface. The disadvantage of a low-speed optical interface is that either it limits the transaction data that are effectively submitted to the token to a small number of values, or that the transmission time is inconveniently high.

What is needed is an alternative cost-effective data input mechanism for strong authentication tokens that allows reliable input of data at relatively high data rates and that is convenient for the user.

DISCLOSURE OF THE INVENTION

The present invention is based on an insight by the inventors that many applications that are secured by means of strong authentication tokens are accessed by the applications' users by means of a PC (personal computer) or similar client computing device (e.g. tablet PC, smartphone, . . . ) most of which have the capability of generating and emitting sounds in the human audible frequency range with a bandwidth that is typically in the order of 10 kilohertz, and that by judiciously modulating sound output by these computing devices it is possible to transmit data at a relatively high data rate to a strong authentication token equipped with means to receive and demodulate the sound thus emitted by these computing devices. The present invention is further based on an insight by the inventors that in such a set-up (i.e. whereby data is exchanged by sound waves in the human audible frequency range, data is transmitted by an audio speaker, data is received by an audio microphone, the transmission medium is the air between speaker and microphone, the medium/room has a certain reverberation and there is usually some amount of background noise in the room) a major source of transmission errors is due to resonances in the mechanical combination of speaker and speaker compartment of the PC (or similar computing device), which may cause distortions in the frequency response of the audio emitting system of the client computing device. Another source of transmission errors may be reflections (e.g. at the walls of the room where the transmission takes place) of the sound signal which arrive at the token's receiver with a significant delay, i.e. giving rise to multipath reception of the acoustical signal. Another reason that multi-path reception of the acoustic signal may occur is if the same acoustic signal is emitted by more than one speaker of the emitting PC (or similar computing device). The acoustic signals emitted by the different speakers may be received by the receiving device with a more or less important delay depending on the spatial arrangement of the speakers and the receiving device relative to one another. If the delay at the receiver between the various signals received through different paths (whether these various signals be different reflections of the acoustic signal(s) originally emitted by the speaker(s) of the emitting device, or multiple instances of the acoustic signal emitted by different speakers, or a combination of these) corresponds to more or less half the period of the carrier frequency and/or the various acoustic signals are being received with a similar power, then destructive interference at the receiver may occur, causing the power of the useful signal to be demodulated to be so low that the signal can no longer be reliably detected or demodulated, or that the signal to noise ratio becomes so low that the number of transmission errors becomes unacceptably high.

Whether or not destructive interference occurs depends on the spatial position of the receiver with respect to the position of the multiple sources of the acoustic signal (e.g. multiple speakers or reflection points). This means that in general in a given room with a given position of the emitting user's computing device there could be spatial zones or areas where destructive interference occurs and other zones where such destructive interference does not occur. As a consequence, if the receiving token happens to be positioned in a zone with destructive interference, the problem might be solved by simply moving the receiving token out of that zone of destructive interference. This solution may however not always be practically effective for a number of reasons.

To begin with, it relies on the user realising that there may be some reception problem that could be solved by moving the token (in general, the average user cannot be expected to be familiar with the concept of destructive interference of acoustic signals).

Secondly, in practice it may prove difficult or impossible to provide the user clear instructions what to do. This is because on the one hand it is in practice impossible for the application that the user is interacting with to know the exact geometry of the room and the spatial position of the receiving token, the speakers of the user's computing device and all possible reflection sources so that it is not feasible to calculate where in the room the zones that should be free of destructive interference are to be found, and on the other hand in many embodiments the token would have no practical way to provide feedback to the application (the token's acoustic interface in a typical case being one-way only).

Thirdly, moving the receiving token to a different position will in general not have an effect if the cause of the transmission problems is due to resonances in the emitting system.

In an alternative solution the receiving token could comprise multiple receiving microphones that are sufficiently spatially distanced from one another so that one may reasonably expect that at least one of the microphones will be in an area that is not affected by destructive interference. This solution may however not always be acceptable as it is likely to increase both the cost and the size of the receiving token and/or may be inconvenient to use. This solution may also not solve transmission problems that are due to resonances in the emitting system.

It is a further insight of the inventors that whether or not the relative delay of the various received copies of the acoustic signal is more or less equal to half the period of the carrier frequency depends not only on the spatial arrangement (which determines the differences in path length which in turn in combination with the fixed speed of sound determine the differences in arrival time and hence the delay expressed in seconds) but also on the wave length of the carrier frequency. I.e. whether or not a given delay is more or less equal to half a period of the carrier frequency depends on the ratio between the given delay and the period of the carrier frequency and therefore, for a given delay, on the frequency of the carrier. Therefore, for a given spatial set-up destructive interference may occur for some carrier frequencies while it may not be a problem for other carrier frequencies in exactly the same spatial set-up.

Also resonances in the audio emitting system of the client computing device will in general be frequency dependent.

One solution to avoid or solve the problems of destructive interference and/or resonances that is based on this insight may comprise simply choosing a different carrier frequency. A complication that may arise with such a solution is that, as explained above, the occurrence of destructive interference depends on the spatial arrangement which may vary from one user to another and which may be unknown to the system emitting the acoustic signal. However, given that the spatial set-up is in general unknown to the application and the receiving token, the application and token in general cannot know in advance which carrier frequencies will result in destructive interference and which will not. Also the computing device that is being used by the user may vary from one usage to another, so that whether resonances occur and at which frequencies might change from one usage to another.

A further complication arises from the fact that in many embodiments the strong authentication tokens adapted to receive input data from a user's client computing device will not have been adapted to send data to the user's client computing device. Even if the token would have the capability to send digital data comprising feedback to the client computing device, it is by no means guaranteed that in general any given client computing device is capable of receiving digital data sent by the token. For example, it is quite possible that the speakers of the client computing device are functioning and enabled, but that the client computing device has no microphone that is functional and enabled and accessible by the application. In other words in many embodiments the digital data communication between a user's client computing device and the user's strong authentication token is strictly one-way only and the strong authentication token at the receiving end has no feedback channel to inform the sending computing device about the actual receiving conditions (e.g. whether the receiving is successful or not, or what the quality is of the signal being received). This makes existing communication techniques comprising any form of communication parameter negotiation unusable. For example since the receiving token will not be capable of informing the sending computing device whether the reception of the signal is successful, a communication scheme whereby the receiver gives an indication to the sender about the quality or success of transmission for any carrier frequency that is used and whereby the sender uses that information to adapt its usage or selection of particular carrier frequencies would be unusable.

A solution based on the inventors' insight regarding the frequency dependence of transmission problems that deals with this complication of a lacking return channel comprises acoustically emitting the same data redundantly using multiple (two or more) carrier frequencies.

In some embodiments the signal transmitting the data to be sent to the receiving token is transmitted redundantly in the time domain. I.e. the signal comprising the same input data is repeated more than once using different carrier frequencies one after the other.

In other embodiments the redundancy is in the frequency domain. I.e, the signal comprising the same input data is emitted over more than one carrier frequency at the same time.

While this fully redundant emitting of the input data may seem an inefficient usage of bandwidth (because the increase in bandwidth by using multiple carrier frequencies is not used to increase the baud rate), it makes the solution much more robust against frequency dependent transmission errors while at the same time allowing for simple and cost effective implementations.

Several digital modulation schemes may be used for modulating the multiple carrier frequencies. In some embodiments Amplitude-shift keying (ASK) may be used. In other embodiments some form of Phase-shift keying (PSK) may be used. In still other embodiments Quadrature Amplitude Modulation (QAM) may be used. In yet other embodiments still other modulation schemes may be used. In some embodiments the same modulation scheme may be used for all carrier frequencies. In other embodiments different modulation schemes may be used for different carrier frequencies. In some embodiments Binary Phase-shift keying (BPSK) may be used for all carrier frequencies.

In some embodiments differential encoding may be used.

In some embodiments data coding schemes may be used that allow error correction and/or error detection by the receiving token.

Selecting the carrier frequencies and symbol rates.

In some embodiments the carrier frequencies are chosen to fall within the audible frequency range. This has at least the following advantages. Firstly, ordinary speakers of most consumer client computing devices are capable of emitting sound frequencies in a substantial part of the audible frequency range. Secondly, this makes the acoustic signal that is emitted perceptible to the user so that the user can very simply notice any emission problems whereby no perceptible acoustic signal is emitted (e.g. because the speakers on the user's client computing device have been turned off, or because they are for some other reason not functional). In some embodiments the carrier frequencies are chosen in the range 50-15,000 Hz. In some embodiments high carrier frequencies are chosen to achieve high baud rates. In some embodiments carrier frequencies above 1000 Hz are chosen to avoid the frequencies below 1000 Hz where most of the power of the human voice is typically concentrated. In some embodiments carrier frequencies above 300 to 500 Hz are chosen because the reliable lower range of typical acoustic transmitters (i.e. speakers) of client computing devices can be estimated to be around 300 to 500 Hz. In some embodiments very high carrier frequencies are not chosen to avoid unpleasant noises. In some embodiments very high carrier frequencies are not chosen to avoid putting too high a burden on the receiving hardware. In some embodiments the carrier frequencies are chosen more conservatively in the range 1000-3000 Hz.

In some embodiments the carrier frequencies are chosen such that the overlap in the power spectral density of the different carriers is minimized. In some embodiments the carrier frequencies are chosen such that the main lobes of the frequency spectra associated with the respective carrier frequencies do not overlap. In some embodiments the carrier frequencies are chosen such that the first minima (i.e. the minima closest to the respective carrier frequencies) of the power spectral density of two adjacent modulated carrier frequencies coincide.

In some embodiments only two carrier frequencies are used in order to minimize cross talk between various carrier frequencies.

In some embodiments the periods of the various carrier frequencies are integer multiples of the period of a common sampling frequency. In some embodiments this common sampling frequency may be a standard sampling frequency associated with a standard audio format. For example the common sampling frequency may be 8000 Hz, 11025 Hz, 22050 Hz, or 44100 Hz. In other embodiments the ratio between at least one of the carrier frequencies and the sampling frequency for generating the one or more digital signal that are to be converted into one or more acoustic signals is not an integer number. In some embodiments the sampling frequency is chosen to be at least twice as high as the highest frequency in the signal to construct. In some embodiments the sampling frequency is chosen to be at least twice the highest carrier frequency plus the baud rate.

In some embodiments the symbol lengths used for the various modulated carrier frequencies are integer multiples of the period of a common sampling frequency. In some embodiments the symbol lengths expressed as the number of periods of the respective carrier frequencies are the same for all carrier frequencies. This causes a difference in symbol lengths expressed in real time and hence a difference in symbol rate for the different carrier frequencies but it keeps the ratio between carrier frequency and symbol rate a constant which may lead to simpler implementations on the receiving side.

In some embodiments where the carrier frequencies are derived from a common sampling frequency a high value for the sampling frequency is chosen to improve the precision of the digitized signals. In other embodiments where the carrier frequencies are derived from a common sampling frequency a low value for the sampling frequency is chosen to simplify (optional) digital filtering and/or reduce the size of resulting audio files. Lower sampling frequencies may speed up the calculations of the digital filtering. For example if Finite Impulse Response (FIR) filters are used, the number of taps in the filter may be lower for lower sampling frequencies. Lower sampling frequencies and the associated smaller audio files may reduce the burden on client computing systems (e.g. with respect to disk access) and reduce the risk of discontinuities or other errors in the sound generation that for example may be caused by a hard disk of a client computing system returning chunks of audio file data with too high a latency.

In an exemplary embodiment two carrier frequencies are used. For both carrier frequencies the ratio between the carrier frequency and the symbol rate is the same (for example for both carrier frequencies a symbol may take 8 periods of the carrier frequency), and the ratio between the symbol rates for each carrier frequency and a common sampling frequency is an integer value (for example the common sampling frequency may be 11025 Hz and the ratio of the symbol rate and the common sampling frequency may be respectively 76 for the low carrier frequency of 1160.53 Hz and 59 for the high carrier frequency of 1494.92 Hz).

In some embodiments the symbol lengths expressed in seconds is the same for more than one carrier frequency.

In some embodiments there are two carrier frequencies that are advantageously chosen such that they (more or less) satisfy the following mathematical relationship: $F_{low}+F_{low}/L_{symbol}=F_{high}-F_{high}/L_{symbol}$, where $F_{low}$, $F_{high}$ and $L_{symbol}$ represent respectively the low carrier frequency, the high carrier frequency and the number of periods of the carrier frequency that are used to transmit a single symbol. This relationship is equivalent to: $F_{low}=F_{high}*(L_{symbol}-1)/(L_{symbol}1)$. The number $L_{symbol}$ of periods of the carrier frequency to transmit a single symbol is assumed to be the same for both carrier frequencies. As a consequence, the baud rate in the low carrier frequency is lower than in the high carrier frequency. For example if one chooses the high carrier frequency to be 1500 Hz and the symbol length to be 8 periods then the low carrier frequency can be calculated to be (7/9) *1500 Hz=1167 Hz.

In some embodiments more than two carrier frequencies are used. In some embodiments the formula above may be used for every pair of adjacent carrier frequencies to determine the spacing of the carrier frequencies. I.e. the carrier frequencies are chosen such that the relationship $F_i*(L_{symbol}+1)/(L_{symbol}-1)=F_{i+1}$ is (more or less) valid whereby the index i ranges from 1 to N-1 with N denoting the total number of carrier frequencies and $F_i$ denoting the i-th carrier frequency ($F_0$ denoting the lowest carrier frequency and $F_N$ denoting the highest of the N carrier frequencies). For example in the case of three carrier frequencies, if one chooses the lowest carrier frequency to be 1167 Hz and the symbol length to be 8 periods of the carrier wave, then the mid carrier frequency may be chosen to be (about) (9/7)*1167 Hz=1500 Hz, and the high carrier frequency to be (about) (9/7)*1500 Hz=1929 Hz.

In some embodiments a modulation scheme is used (e.g. PSK) for which the power spectral density of the modulated carrier frequencies is described by a function of the form [sin $c^2(f-f_c)*(L_{symbol}/f_c)+\sin c^2((f-f_c)*(L_{symbol}/f_c))$] (wherein sin c is the normalized sinus cardinal's function i.e. sin(Pi*x)/(Pi*x), f is the frequency and $f_c$ is the carrier frequency). This function has zeros at every frequency that is distanced from the carrier frequency by an integer multiple of the symbol rate. If the carrier frequencies are selected according to the formulas given above (i.e. $F_{low}=F_{high}*(L_{symbol}-1)/(L_{symbol}+1)$ and/or $F_i*(L_{symbol}+1)/(L_{symbol}-1)=F_{i+1}$) then the first minima in the power spectral density functions of adjacent modulated carrier frequencies coincide.

Filtering

In some embodiments the signals resulting from the modulation of the carrier frequencies may be pre-filtered before they are being emitted so as to suppress the side-lobes outside the main lobes centred on the respective carrier frequencies in the frequency domain, which diminishes cross talk between the signals of the different modulated carrier frequencies. For example in some embodiments a baseband signal carrying a representation of the data to be transmitted may be filtered prior to modulating a carrier with the baseband signal. In some embodiments this pre-mixing filtering may comprise Root-Raised-Cosine (RRC) filtering or Square-Root-Raised-Cosine (SRRC) filtering. In some embodiments the modulated carrier may be filtered. For example in some embodiments the digital signal that is the result of mixing a carrier with an (optionally pre-filtered) baseband signal may be filtered with a band-pass filter. Thus pre-filtering the signals before emitting them as sound signals may have the advantage of reducing the channel bandwidth, reducing inter-symbol interference, improving the signal-to-noise ratio of the emitted acoustic signal, make the acoustic signal less annoying to the user (while using the same volume level the filtered signal has less power, i.e. it sounds quieter, as the low frequency component has been suppressed thus removing for example annoying 'clicking' on each phase change in the case of PSK modulated signals)

In some embodiments the power of the signals (before physical acoustic emission) in the various modulated carrier frequencies is equal or similar. In other embodiments the power of the signal in at least a first modulated carrier frequency is lower than the power of the signal in at least a second carrier frequency. One advantage of having a lower power in one carrier frequency is that this carrier frequency will cause less interference for the other carrier frequencies. In some embodiments the power of the signal in at least a first modulated carrier frequency is set such that on the one hand it is lower than the power of the signal in at least a second carrier frequency while on the other hand it still has enough power to be receivable by the receiving token if the power of the second carrier frequency as received by the token is suppressed e.g. by resonances in the emitting speaker or destructive interference due to multipath reception. For example in some embodiments two carrier frequencies are being used at the same time and the power of the first modulated carrier frequency is 6 dB lower than the power of the other modulated carrier frequency. In some embodiments the distribution of power over the various signals in the various modulated carrier frequencies is changed in time. For example in some embodiments two carrier frequencies are being used at the same time and the emitting system switches back and forth between periods in which the power of the first modulated carrier frequency is 6 dB lower than the power of the other modulated carrier frequency and periods in which it is the other way round (i.e. the second carrier frequency is 6 dB weaker than the first carrier frequency). In some embodiments the lengths of these periods are chosen to be an integer multiple of the message lengths in the various modulated carrier frequencies.

In some embodiments the signals of the multiple modulated carrier frequencies may be mixed before the mixed signal is acoustically emitted over one or more speakers. In some embodiments only one speaker of the emitting client computing device is used to emit the mixed acoustical signal. In other embodiments all available speakers of the emitting client computing device are used to emit the mixed acoustical signal In some embodiments the different modulated carrier frequency signals are not mixed before they are acoustically emitted. In some embodiments at least some of the different modulated carrier frequency signals may be emitted acoustically by separate speakers. For example in some embodiments two carrier frequencies may be used and the low carrier frequency signal may be emitted by one speaker while the high carrier frequency signal may be emitted by another speaker.

In a typical embodiment the input data for the token is transmitted as modulated sound that is emitted and input to the token by means of an acoustical interface.

In some embodiments the transmitting system for sending input data to a token includes a client computing device with which the user interacts (e.g. to access an internet based application). The client computing device may comprise processing components (such as a microprocessor) for processing data and/or executing software, storage components (such as a hard disk) for storing data and/or software, user interface components (such as a display, a keyboard and/or a mouse) for interacting with the user (which may include providing output to the user and receiving input from the user), and communication components (such as a networking interface, for example an Ethernet card) for interacting with for example a web server over a computer network (such as for example the internet). In some embodiments the user's client computing device may include a Personal Computer (PC), or a Tablet Computer, or a Smartphone, or some other similar computing device with which the user interacts (e.g. to access an internet based application). In some embodiments the user's client computing device is equipped with one or more speakers capable of emitting sounds in the human audible frequency range. In a particular embodiment one or more speakers of the user's client computing device emit the sound output of a software application running on the PC. In one embodiment the software application running on the user's client computing device includes a browser which may be running an applet or plug-in embedded in a web page. In one embodiment the applet includes a flash application. In some embodiments the web page may comprise an audio file comprising a digital representation of the acoustic signal carrying the input data for the token. In some embodiments the audio file may comprise a WAVE or WAV (Waveform Audio File Format) file. In some embodiments the web page is associated with the application to be secured by the strong authentication token.

In some embodiments the transmitting system for sending input data to a token comprises also a server computer. The server computer may comprise processing components (such as one or more microprocessors) for processing data and/or executing software, storage components (such as one or more hard disks) for storing data (e.g. in a database) and/or software, and communication components (such as one or more networking interface, for example an Ethernet card) for interacting with for example a client computing device over a computer network (such as for example the internet). In some embodiments the server computer may comprise a web server. In some embodiments the server computer may exchange data with a client computer device over a computer network such as the internet using computer communication protocols such as for example TCP/IP (Transmission Control Protocol/Internet Protocol), SSL/TLS (Secure Sockets Layer/Transport Layer Security), HTTP (Hypertext Transfer Protocol), or the like. In some embodiments the server computer may serve the client computing device one or more web pages comprising data to be transmitted to the authentication token. In some embodiments the one or more web pages may comprise an audio file comprising a digital representation of the acoustic signal carrying the input data for the token. In some embodiments the audio file may comprise for example a WAVE or WAV (Waveform Audio File Format) file.

In some embodiments the token comprises an acoustical interface that includes at least one microphone and a demodulation circuit. The at least one microphone is for receiving an acoustical signal and for converting the acoustical signal into an analog electrical signal. The at least one microphone is connected to a demodulation circuit which converts the analog electrical signal into one or more digital signals. In one embodiment the demodulation circuit is connected to a data processing means which is adapted to extract and treat input data coded in the one or more digital signals.

In some embodiments the demodulation circuit includes a pre-amplifying component for selectively amplifying the microphone's electrical signal prior to actual demodulation. In some embodiments the pre-amplifying component includes a band-pass filter which suppresses frequencies lower than the lowest carrier frequency (minus a certain margin) and suppresses frequencies higher than the higher carrier frequency (plus a certain margin). In some embodiments the token comprises for each carrier-frequency a band-pass filter centred on the corresponding carrier-frequency. In some embodiments the token comprises a band-pass filter that can be tuned to be centred on a selected carrier frequency.

In some embodiments the token is capable of demodulating a single carrier frequency at a time. The token may be adapted to select an initial carrier frequency. If the token is capable of successfully receiving input data using the selected carrier frequency, the token continues demodulating the selected carrier frequency. The token may apply some criteria to switch to another carrier frequency. Some of these criteria may be related to the power of the received signal in a band around the selected carrier frequency (in absolute terms or in relation to the power in another band e.g. a band around another carrier frequency). For example, the token may select the carrier frequency that has the highest power in a certain band around that carrier frequency. Some criteria for switching to another carrier frequency may be related to the perceived error rate in the demodulated signal. For example the token may decide to select a different carrier frequency if after a certain amount of time the apparent error rate is higher than a certain threshold.

In some embodiments the token is adapted to demodulate multiple carrier frequencies in parallel. In some embodiments the token is adapted to select one data stream from the various demodulated carrier frequencies for further processing. In some embodiments the token applies certain selection criteria for selecting the data stream for further processing from the various carrier frequencies that are demodulated in parallel. These criteria may comprise criteria that are related to certain characteristics of the received carrier frequency signals such as the power in a band around each carrier frequency, or may comprise criteria related to the perceived error rate in the respective data streams. In some embodiments the different data streams are combined into a single data stream for further processing. For example in one embodiment more than two carrier frequencies may be used in which the data is redundantly being emitted in a synchronous way (using the same baud rate) and the various resulting data streams are simply combined by means of a voting mechanism. I.e, at any given time the symbol value that occurs most frequently at that time in the various data streams corresponding to the various carrier frequencies being demodulated is withheld as the symbol value at that time for the resulting data stream for further processing.

In some embodiments the number of multiple carrier frequencies that the token is capable of demodulating in parallel is less than the total number of carrier frequencies that are being used at the emitting side. In some embodiments the token may vary from time to time the set of carrier frequencies that it is demodulating in parallel. In some embodiments the token may add or remove or replace from time to time one or more of the carrier frequencies that it is demodulating in parallel. The token may apply various selection criteria to decide when and which of the carrier frequencies that it demodulates in parallel it will add, remove or replace. These criteria may comprise criteria that are related to certain characteristics of the carrier frequency signals such as the power in a band around each carrier frequency, or may comprise criteria related to the perceived error rates in the respective data streams of the demodulated carrier frequencies.

In some embodiments the token comprises a combination of hardware and software adapted to do the signal processing described in some of the preceding paragraphs. In some embodiments all or most of the signal processing (apart from the analog-to-digital conversion) is done by software executed on one or more microprocessors. In some embodiments the token comprises Digital Signal Processing (DSP) hardware and/or software to do some or all of the signal processing described in some of the preceding paragraphs.

In some embodiments the token may have additional data input mechanisms besides the acoustical input interface to receive input data. Said additional data input mechanisms may include a manual user input interface allowing the user to manually enter data into the token. This manual user input interface may include a keypad or a keyboard. It may also include alternative mechanisms to manually enter data such as joysticks, jog dials, track balls, turn wheels, or similar devices. In some embodiments the user input interface may comprise a touch screen. In some embodiments the user input interface may comprise a software keyboard, i.e. an image of a keyboard, with keyboard or touch screen navigation. The additional input interfaces may also include communication mechanisms and protocols such as electrical personal area networks such as USB or Firewire, or optical connections, or wireless personal area networks using radio transmission such as Bluetooth or infrared transmission such as IRDA (Infrared data association).

In some embodiments the token has no keypad resulting in a compact design. In other embodiments the token has a compact manual user input interface adapted to allow a user to manually enter input data such as a PIN. The compact user input interface may comprise a keypad with no more than three or four keys, or a wheel to scroll through a set of options (such as a list of digits) in combination with no more than two buttons, or even only a wheel to scroll through a set of options whereby the wheel can also function as a push button to confirm the currently selected option. In some embodiments the compact manual user input interface may consist of a navigation mechanism and a confirmation mechanism, whereby the navigation mechanism permits the user navigation through a list of options and/or selection of an item of a list of options, and the confirmation mechanism permits the user to give a confirmation to the token e.g. to confirm a currently selected item such as an option or data element or to confirm information presented by the token to the user or to confirm a suggestion by the token. In some embodiments the compact manual user input interface may also comprise a cancellation mechanism that permits the user to indicate to the token that the user disapproves or cancels something presented to the user. In some embodiments the navigation mechanism comprises a turn wheel or a jog dial. In some embodiments the navigation mechanism may comprise one, two or more than two navigation buttons. In some embodiments the confirmation mechanism may comprise an OK button. In some embodiments the cancellation mechanism may comprise a cancel button. In some embodiments the data input means of the token may consist of only an acoustical input interface and a compact manual user input interface.

In one set of embodiments of the invention the token includes a keypad. In one embodiment this keypad allows entry of at least the decimal digits. In another embodiment said keypad also allows entry of hexadecimal digits or alphanumerical characters. In some embodiments said keypad includes control buttons to indicate user approval or rejection of information or options presented by the token, or navigation buttons to navigate through menu options or through information presented by the token. In other embodiments said keypad includes a full keyboard. In some embodiments, both a keypad and an optical interface may be present besides the acoustical input interface, where the keypad could serve as a back-up input means in case the optical and/or acoustical input means fail.

In some embodiments the manual user input interface is adapted to permit the user to indicate approval of, e.g. data to be signed, or to indicate preferences such as whether an optical or acoustical interface should be used to receive input data. In some embodiments the manual user input interface is adapted to permit the user to provide values to the token. These values may include transaction data to be signed or a PIN value.

In some embodiments the token includes a user output interface by means of which the token can output or present information to the user. In some embodiments the information output to the user may include security values such as one-time or dynamic passwords and/or signatures on e.g. transaction related data. In some embodiments the information presented to the user may include data to be signed by the token for prior approval by the user. In some embodiments the information presented to the user may include information about the data to be signed such as the meaning of certain data elements or information about a transaction context such as a reference or name to an application owner.

In some embodiments of the invention the token's output means include a display such as for example a Liquid Crystal Display (LCD) and/or one or more Light Emitting Diodes (LEDs) for example to indicate certain security statuses or conditions. In one embodiment the token can display texts on the display. In an embodiment said texts can be displayed as a sequence of characters. On another embodiment the token can display icons or pictograms on the display. In some other embodiment the token's output means include audio output means such as for example a loudspeaker, earphones, or means to attach such loudspeaker or headphones such as for example a ⅛" audio socket or an RCA audio socket, to convey information to the user by means of generated sounds. In one embodiment the generated sounds are sequences of tones. In another embodiment the generated sounds consist of synthesized speech. In another embodiment the generated sounds are reproductions of stored sound fragments.

In some embodiments the token may have been adapted to have a trustworthy user input interface. In some embodiments this includes the token's input interface being adapted so that the token can always distinguish between data manually input by a user physically interacting with the token and data that is provided to the token but that is not manually entered by some user physically interacting with the token. In some embodiments the manual user input interface may be non-removable and not user-serviceable, fully controlled by the token, and immune for interference by malicious software on a host computer. In some embodiments the token may be adapted to resist unauthorised changes to the token firmware. In some embodiments the token's firmware may be stored in unalterable memory such as ROM. In some embodiments the token supports firmware updates but the firmware can only be updated by means of cryptographically protected secure firmware update protocols. In some embodiments the token may have tamper resistance and/or tamper detection mechanisms which may include mechanisms to detect opening of the token's housing.

In some embodiments the token may have been adapted to have a trustworthy user output interface. In some embodiments this includes the token's user output interface being adapted so that the token fully controls any output the token presents to the user. In some embodiments the user output interface may be non-removable and not user-serviceable, fully controlled by the token, and immune for interference by malicious software on a host computer. In some embodiments the token may be adapted to resist unauthorised changes to the token firmware. In some embodiments the token's firmware may be stored in unalterable memory such as ROM. In some embodiments the token supports firmware updates but the firmware can only be updated by means of cryptographically protected secure firmware update protocols. In some embodiments the token may have tamper resistance and/or tamper detection mechanisms which may include mechanisms to detect opening of the token's housing.

In a particular embodiment of the invention the token includes data processing means such as a microprocessor to perform cryptographic operations and data storage means such as RAM, ROM or EEPROM memory to store one or more secret values such as one or more PIN values or cryptographic secret keys. In some embodiments the token is adapted to prevent unauthorized reading of these secret values. For example the token may have tamper resistance and/or tamper detection mechanisms which may include mechanisms to detect opening of the token's housing.

In one embodiment of the invention the input data can include a challenge (e.g., a random number or hash of transaction data that may be processed for authentication/validation purposes). In another embodiment of the invention the input data includes transaction related data including transaction values or transaction context information. In some embodiments the transaction context information may include transaction data labels and/or information regarding the meaning of the transaction related data. In some embodiments the input data includes application flow related information. In some embodiments the application flow related information may include information regarding the type of transaction. In some embodiments the application flow related information may guide the token with respect to the way that the token should handle the received transaction related data and/or how the token should handle the user interaction flow, for example which data should be presented to the user for review and/or approval and whether the user should be asked or given the opportunity to correct data or manually provide extra data and/or which messages should be presented to the user.

In some embodiments the input data may include a server credential that has been cryptographically generated by a server. In some embodiments the server has generated the server credential using a symmetric cryptographic and secret key that is shared with the token or a second security device that the token communicates with. In some embodiments the token is adapted to verify the server credential. In some embodiments the token is adapted to verify the server credential in cooperation with a second security device. In some embodiments the verification of the server credential is done using a symmetric cryptographic algorithm that uses a secret key shared with the server. In some embodiments the server credential comprises a server one-time password. In some embodiments the server credential comprises a data signature. In some embodiments the server credential comprises a Message Authentication Code (MAC). In some embodiments the server credential comprises encrypted input data. In some embodiments the purpose of the server credential is to authenticate a server or server application. In some embodiments the purpose of the server credential is to authenticate input data received by the token from a server. In some embodiments the purpose of the server credential is to protect the integrity of input data received by the token from a server. In some embodiments the purpose of the server credential is to protect the confidentiality of input data received by the token from a server. In some embodiments the generation of dynamic security credentials by the token may be conditional on successful verification of the server credential.

In one particular embodiment the input data are encoded as a binary data string including a sequence of bits.

Generation of dynamic security values.

In some embodiments the token is adapted to generate dynamic security values. In some embodiments the generated dynamic security values may comprise one-time or dynamic passwords, and/or responses to challenges and/or electronic signatures on transaction data. In some embodiments the token is adapted to present generated dynamic security values to the user. In some embodiments the dynamic security values are generated by cryptographically combining at least one secret value (such as a cryptographic key) with at least one dynamic value (such as a time value and/or a counter value and/or a challenge and/or transaction related data). In some embodiments the cryptographically combining comprises performing a cryptographic algorithm. In some embodiments the cryptographic algorithm may comprise a symmetric encryption or decryption algorithm such as DES, 3DES or AES. In some embodiments the cryptographic algorithm may comprise a hashing or keyed hashing algorithm such as SHA-1 or HMAC.

In some embodiments the token comprises a data processing component that is adapted to perform a cryptographic algorithm that is used in the generation by the token of dynamic security values. In some embodiments the token comprises a memory component for storing one or more cryptographic secrets that are used in the generation by the token of dynamic security values. In some embodiments the stored cryptographic secrets are symmetric keys shared with an authentication server. In some embodiments the stored cryptographic secrets are stored in the token in a non-volatile memory and used for multiple generations of dynamic security values. In some embodiments the stored cryptographic secrets are used for only one generation of a dynamic security value and may in some embodiments be stored in volatile memory and/or actively erased from memory after the dynamic security value has been generated.

In some embodiments the token is adapted to communicate with a second security device and the dynamic security values are generated by the token in conjunction or cooperation with that second security device. In some embodiments the token is adapted to send a command to the second security device, to receive a response from the second security device and to derive a dynamic security value from that response. In some embodiments the second security device stores a secret key and the token instructs the second security device to use that secret key in a cryptographic calculation and to return a result of that cryptographic calculation to the token. In some embodiments the second security device cryptographically combines the secret key that it stores with one or more data elements that it has received from the token such as for example a challenge or transaction data. In some embodiments the second security device cryptographically combines the secret key that it stores with one or more data elements that it stores and maintains internally such as for example a counter. In some embodiments the token uses the response of the second security device to derive a secret key that it cryptographically combines with a dynamic variable to generate a dynamic security value. In some embodiments the dynamic variable may be derived from data input (such as for example a challenge or one or more transaction related data elements) into the token through the acoustical input interface of the token. In some embodiments the second security device comprises a smart card. In some embodiment the smart card comprises a financial smart card that is compliant with the Europay, MasterCard, Visa (EMV) standard and the token is adapted to communicate with EMV compliant smart cards.

PIN handling.

In some embodiments the token is adapted to receive a PIN value provided by the user. In some embodiments the token is adapted to pass on a PIN value provided by the user to a second security device (such as a smart card) for verification. In some embodiments the token is adapted to remove from its memory any copy in any format of such a PIN value once that PIN value has been verified. In some embodiments the token has been adapted to actively erase or overwrite, after the PIN value has been verified, the memory locations where such a PIN value has been temporarily stored.

Co-existence in the same token of an acoustical and an optical input interface.

In some embodiments the application on the user's computing device (which may include e.g. a PC, a Tablet computer or a Smartphone) emits an acoustical signal that encodes input data destined to be received by the user's token. In some embodiments the user's computing device has a display that displays optically encoded input data destined to be received by the user's token. The optically encoded data may, for example, be encoded in a flashing pattern. In some embodiments the user's computing device both emits an acoustical signal that encodes input data destined to be received by the user's token and it has a display that displays a flashing pattern that also encodes input data destined to be received by the user's token. In some embodiments the data that the user's computing device emits acoustically and the data that it encodes optically encode substantially the same information. In some embodiments the data that the user's computing device emits acoustically is different from the data that it encodes optically. In some embodiments the data that the user's computing device emits acoustically is complementary to the data that it encodes optically.

In some embodiments the token has both an acoustical and an optical input interface and may optionally also have a manual user input interface.

In some embodiments the token is adapted to receive from the user an indication whether the token should receive input data via its optical input interface of via its acoustical input interface. In some embodiments when the user has indicated that the optical input interface should be used to input data the token enables the optical input interface and may disable the acoustical input interface. In some embodiments when the user has indicated that the acoustical input interface should be used to input data the token enables the acoustical input interface and may disable the optical input interface.

In some embodiments the acoustical and optical input interface may be both enabled at the same time. In some embodiments the acoustical and optical input interface are both enabled by default. In some embodiments, when the acoustical and optical input interface are both enabled at the same time, the token is adapted to receive data concurrently through both the acoustical and optical input interface. In some embodiments the token is adapted to assemble or combine the data that it received through the optical input interface with the data that it received through the acoustical input interface. For example, if a message to be received by the token consists of multiple data blocks, the token may receive some data blocks of the message through the optical input interface and other data blocks of the message through the acoustical input interface and the token may combine these data blocks to assemble the full message. This may for example be the case when the user's computing device sends the same message via the acoustical and the optical input interfaces but due to transmission errors in both the optical and the acoustical channel some data blocks may not have been correctly received via the acoustical input interface while other data blocks may not have been correctly received via the optical input interface. In some embodiments the token is adapted to receive data through both the acoustical and optical input interfaces concurrently and to assume that the same message is sent through both the acoustical and optical input interfaces. In some embodiments the token is adapted to receive data through both the acoustical and optical input interfaces concurrently and to consider message reception successful as soon as it has successfully received a message via either of the optical or acoustical input interface.

In some embodiments the token is adapted to select one of the optical or acoustical input interfaces to receive data without receiving an indication of the user.

In some embodiments the token comprises an input interface selection mechanism to select one of the optical or acoustical input interfaces. In some embodiments the input interface selection mechanism may be implemented using a data processing component such as a microprocessor or a logical circuit.

In some embodiments the input interface selection mechanism decides by means of heuristic rules on the basis of certain characteristics of the signals received through the acoustic and optical input interfaces which input interface is preferred to receive data. In some embodiments the token analyses the signals of both the acoustical and optical input interface concurrently and based on the outcome of this analysis decides whether to perform further processing on the signal of either the optical or the acoustical input interface to try to demodulate data and receive a message. In some embodiments this analysis comprises analysing the energy and/or the frequency content of the optical and/or acoustical signals. In some embodiments the analysis comprises comparing the energy in a specific frequency range of the received signal to a reference value.

In some embodiments the token is adapted to select one of the optical or acoustical input interfaces to receive data in the following way. Initially the token tries for a certain period (for example a second or even less than a second) to receive at least some data through a first one of the optical or input acoustical interface. If that is successful then the token selects this input interface and continues receiving data through the selected input interface. If it fails then the token repeats the selection process with the other input interface. This selection process may continue until the token is successful in receiving data through one of the input interfaces.

In some embodiments the token is adapted to detect transmission problems when it is receiving data through the selected input interface. In some embodiments the token may be adapted, in case of transmission problems with the selected input interface, to return to the interface selection phase. In some embodiments the decision to return to the interface selection phase may depend on pre-defined criteria. In some embodiments these pre-defined criteria may take into account characteristics of the detected transmission errors. In some embodiments the token may for example decide to return to the interface selection phase when a predefined threshold of the number of transmission errors per time unit has been exceeded.

In accordance with one aspect of the present invention, a strong authentication token generates dynamic security values by receiving an acoustical signal from a remote computer system at the authentication token, obtaining the input data by demodulating the acoustic signal, and generating the dynamic security value at the authentication token which may comprise recovering the input data from the acoustical signal and processing the recovered input data. The authentication token may include a communication interface for communicating with a removable security device and the generating step may include generating the dynamic security value with the authentication token in cooperation with the removable security device. The method may additionally include receiving an optical signal including additional input data and the generating step may include combining the recovered input data and the additional input data.

Yet another aspect of the invention comprises a method to secure a remote server-based application being accessed by a user through a computing device communicating with the application server e.g. over the internet. The method may comprise the following steps.

Making available to a user an authentication token comprising an acoustical input interface. The authentication token may be one of the authentication tokens described in any of the preceding paragraphs. In some embodiments also a second security device such as a smart card is made available to the user to be used in conjunction with the authentication token to generate a dynamic security value.

Assembling input data to be input into said authentication token. These input data may comprise for example a challenge, or transaction related data, or transaction context related data. In some embodiments the input data may comprise a server credential. To obtain the server credential the server may optionally first generate a server credential. The server may generate the server credential using a secret key and a cryptographic algorithm. The cryptographic algorithm may be a symmetric cryptographic algorithm. In some embodiments the secret key for generating the server credential may be shared with the user's authentication token.

Sending the input data to the user's computing device. The user's computing device may be running a computer application such as a web browser. The input data may be embedded in one or more web pages that the server-based application serves to the computing device's browser.

Emitting at the user's computing device a modulated acoustical signal encoding for the input data to be received and demodulated by the authentication token for the authentication token to recover the input data. The authentication token may receive and demodulate the acoustical signal and recover the input data from the demodulated acoustical signal as described in the preceding paragraphs. In some embodiments also an optical signal may be emitted at the user's computing device. In some embodiments the optical signal may encode data comprising part or all of the input data.

Receiving from the user a dynamic security value that has been generated by the authentication token. The authentication token may generate the dynamic security value as described in the preceding paragraphs. In some embodiments the authentication token comprises a communication interface to communicate with a removable second security device and the authentication token generates the dynamic security value in cooperation with the removable second security device. In some embodiments the authentication token processes the input data to generate a dynamic security value. In some embodiments the dynamic security value is generated by cryptographically combining a dynamic variable with a secret key. In some embodiments the cryptographically combining comprises using of a symmetric cryptographic algorithm. In some embodiments the dynamic variable comprises a challenge. In some embodiments the dynamic variable comprises transaction related data. In some embodiments the dynamic variable comprises a time related value. In some embodiments the dynamic variable comprises a counter. In some embodiments the dynamic variable comprises a data element comprised in the input data received from the server-based application. In some embodiments the dynamic security value is generated using a key that is shared with the server-based application. In some embodiments the input data comprises a server credential and the authentication token verifies the server credential prior to generating the dynamic security value. In some embodiments the authentication token uses a symmetric cryptographic algorithm with a secret key that is shared with the application server to verify the server credential. In some embodiments the authentication token generates the dynamic security value on condition that verification of the server credential was successful. In some embodiments the authentication token comprises a secure user output interface and uses that secure user output interface to output the dynamic security value to the user. In some embodiments the user receives the dynamic security value and enters the dynamic security value on a web page related to the server-based application.

Verifying the received dynamic security value. The application server may verify the received dynamic security value using a cryptographic algorithm. In some embodiments the application server cryptographically combines a reference dynamic variable with a reference secret key to verify the received dynamic security value. In some embodiments the application server generates a reference security value and compares the reference security value with the received dynamic security value. In some embodiments the application server computes the reference security value by cryptographically combining a reference dynamic variable with a reference secret key. In some embodiments the cryptographically combining comprises performing a symmetric cryptographic algorithm. In some embodiments the secret key comprises a secret key that the application server shares with the authentication token or with a removable second security device the user's authentication token has cooperated with to generate the dynamic security value.

Taking appropriate action depending on the outcome of the verification of the dynamic security value. In some embodiments this may comprise that the user is granted access to the server-based application in case the verification was successful and is refused access in case the verification was not successful. In some embodiments this may comprise that a transaction request submitted by the user is performed if the verification was successful and is not performed if the verification was not successful.

In some embodiments the application server may comprise one or more server computers running one or more software applications. In some embodiments the application server may comprise one or more web servers. In some embodiments the application server may comprise one or more databases for storing data. In some embodiments the application server may use and/or store user related data. In some embodiments the application server may use and/or store data related to the authentication token. In some embodiments the data related to the user or the authentication token comprise one or more secret keys. In some embodiments one or more of these secret keys may be shared with the user's authentication token or with a removable second security device the user's authentication token has cooperated with to generate the dynamic security value.

ADVANTAGEOUS EFFECTS

An important advantage of the present invention is that a strong authentication token equipped with an acoustic interface including a relatively small number of low-cost components can receive input data at a considerably higher rate than a strong authentication token equipped with an optical interface of similar cost.

Another advantage of the present invention is that a strong authentication token with an acoustical interface but without a keypad (or with a keypad with only a reduced set of keys) can still receive data input in a way that is convenient for the user while having considerably reduced dimensions in comparison to a token that is equipped with a keypad with a full set of at least numerical keys.

Another distinct advantage of the present invention is that a strong authentication token equipped with an acoustic interface including a demodulation circuit and whereby the token is adapted to receive multiple acoustic signals that use different carrier frequencies and that transmit the same data to be transmitted to the token and that are emitted redundantly (at the same time or in sequence) according to some of the embodiments of the invention allows for robust and reliable demodulation of an acoustic signal even in the presence of background noise, resonances in the emitting speakers and multi-path reception reflections.

BRIEF DESCRIPTION OF THE DRAWINGS

The foregoing and other features and advantages of the invention will be apparent from the following, more particular description of an embodiment of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
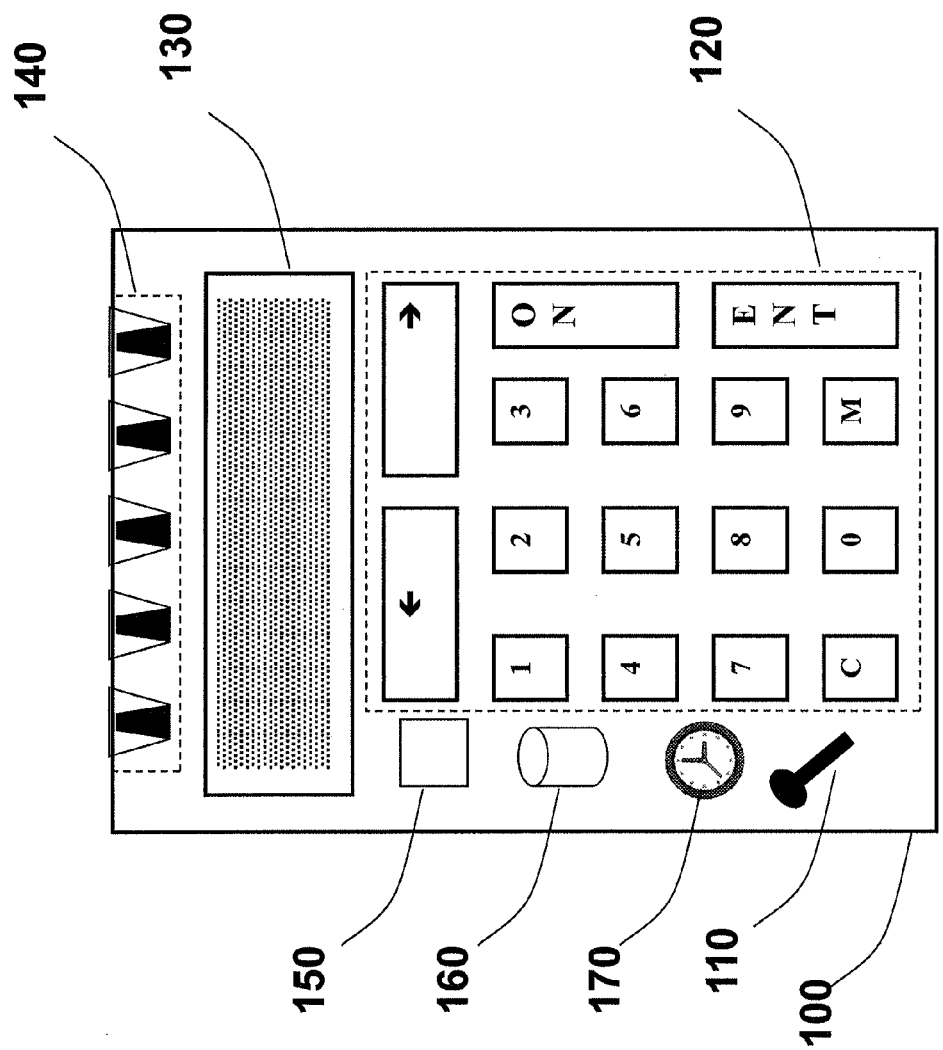
FIG. 1 illustrates an authentication token according to one aspect of the invention.

FIG. 1 illustrates a typical implementation of the invention consisting of a token (100) for generating security values such as one-time passwords to authenticate a user or transaction signatures to indicate the user's approval of a transaction, including:
- an acoustical interface (110) for receiving acoustical signals transmitting input data for the token;
- a trustworthy output interface (130), such as for example a display or an audio output interface, to communicate information, such as said security values or transaction data to be approved, to the user;
- (optionally) one or more additional data input interfaces, such as a manual user data input interface (120) comprising for example a keypad and/or an optical data input interface (140) comprising for example one or more photosensitive elements such as an array of photosensitive elements, for receiving input data (which may include a challenge and/or transaction data) and/or to capture the user's approval of transaction data;
- a data processing component (150), such as a microprocessor, a controller, an FPGA (Field Programmable Gate Array) or an ASIC (Application Specific Integrated Circuit), capable of cryptographic operations, for generating security values (such as dynamic passwords and/or electronic signatures) and/or verifying server credentials, using secrets shared with a server;
- a data storage component (160), such as a ROM, EEPROM, or battery-backed RAM, for storing data which may comprise configuration data and/or storing secrets which may include an access code to the token (e.g. a PIN) and/or secrets shared with a server and used for generating security values and/or verifying server credentials;
- a clock (170) to provide a time value that can be used in the verification of a server credential or in the generation of a security value.

The data processing component (150) may be connected to acoustical interface (110), manual user data input interface (120), and/or optical data input interface (140) to receive data. The data processing component (150) may be connected to trustworthy output interface (130) for communicating information to the user. The data processing component (150) may be connected to, or comprise or may be part of the same component as data storage component (160) and may be capable of reading and/or writing data from/to data storage component (160). The data processing component (150) may be connected to, or comprise or may be part of the same component as clock (170) and may be capable of obtaining a time value from clock (170).

In some embodiments the keypad (120) may comprise less keys or buttons then the keys shown on FIG. 1. In some embodiments the keypad (120) may comprise more keys or buttons then the keys shown on FIG. 1.

In some embodiments the acoustical interface (110) includes a microphone and a demodulation circuit. In some embodiments the acoustical interface (110) may comprise more than one microphone.

In some embodiments, the data processing component (150) implements an input interface selection mechanism to select either the optical (140) or the acoustical (110) input interface to receive input data.

Figure 2:
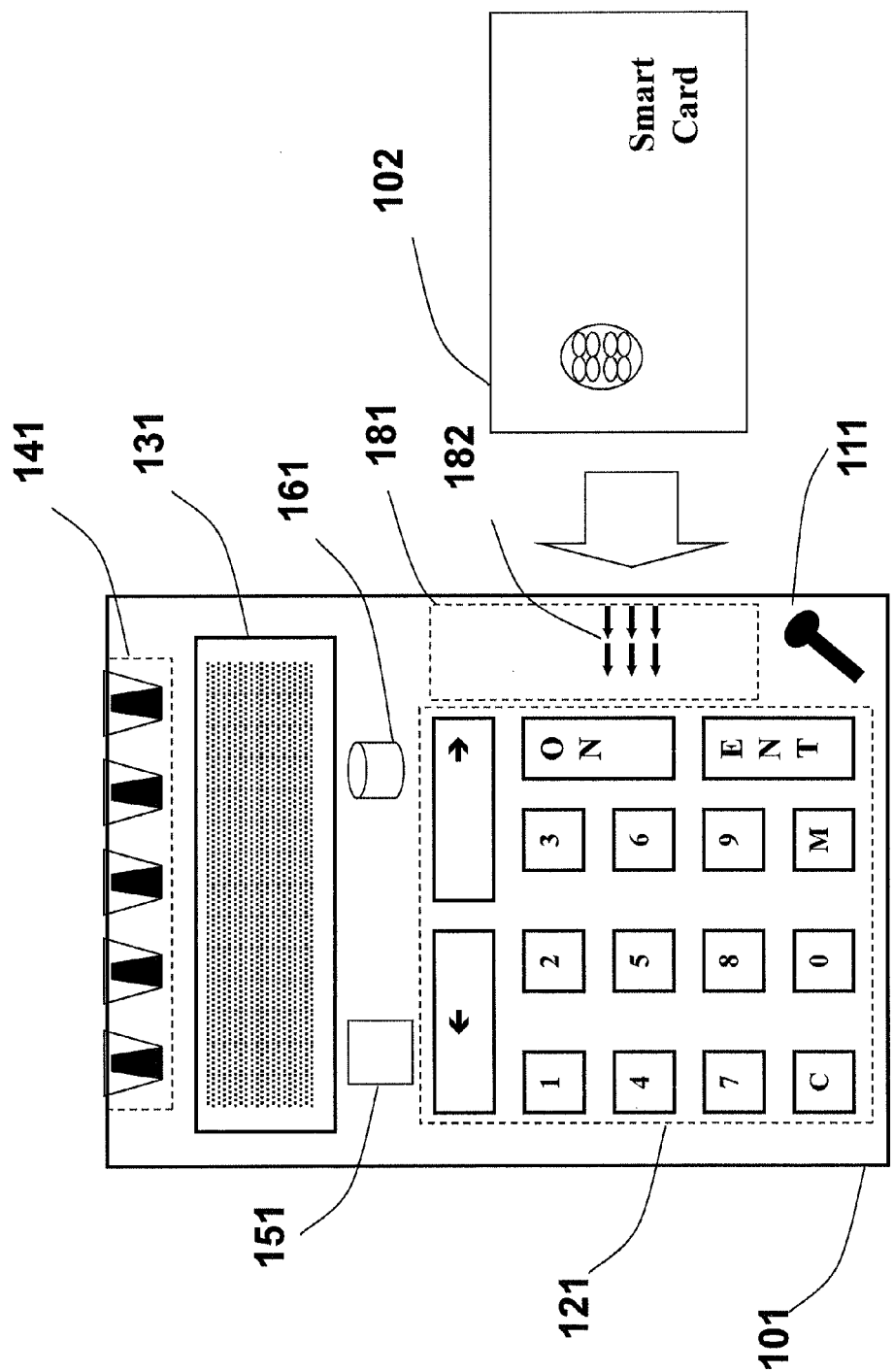
FIG. 2 schematically illustrates another embodiment of the invention.

FIG. 2 schematically illustrates another typical implementation of the invention consisting of a first security device (101) for generating security values such as one-time passwords to authenticate a user or transaction signatures to indicate the user's approval of a transaction, and capable of communicating with a removable second security device (102), such as for example a smart card, to which for example some cryptographic operations can be delegated, including:
- an acoustical interface (111) for receiving acoustical signals transmitting input data;
- a trustworthy output interface (131), such as for example a display or an audio output interface, to communicate information, such as said security values or transaction data to be approved, to the user;
- (optionally) additional data input interfaces, such as a manual user data input interface (121) comprising for example a keypad and/or an optical data input interface (141) comprising for example one or more photosensitive elements such as an array of photosensitive elements, for receiving input data (which may include a challenge and/or transaction data) and/or to capture the user's approval of transaction data;
- a data processing component (151), such as a microprocessor, a controller, an FPGA (Field Programmable Gate Array) or an ASIC (Application Specific Integrated Circuit), that may be capable of cryptographic operations, for generating security values (such as dynamic passwords and/or electronic signatures) and/or verifying server credentials, whereby secrets maybe used that are shared with a server and whereby the generating and/or verifying may be done in cooperation with the removable security device;
- a data storage component (161), such as a ROM, EEPROM, or battery-backed RAM, e.g. for storing configuration data and/or secrets which may include secrets shared with a server and used for generating security values and/or verifying server credentials;
- an interface (181), including for example a smart card connector (182), to interact with a removable security device (102).

The data processing component (151) may be connected to acoustical interface (111), manual user data input interface (121), and/or optical data input interface (141) to receive data. The data processing component (151) may be connected to trustworthy output interface (131) for communicating information to the user. The data processing component (151) may be connected to, or comprise or may be part of the same component as data storage component (161) and may be capable of reading and/or writing data from/to data storage component (161). The data processing component (151) may be connected to, or comprise or may be part of the same component as clock (171) and may be capable of obtaining a time value from clock (171).

In some embodiments the keypad (121) may comprise less keys or buttons then the keys shown on FIG. 2. In some embodiments the keypad (121) may comprise more keys or buttons then the keys shown on FIG. 2.

In some embodiments the acoustical interface (111) includes a microphone and a demodulation circuit. In some embodiments the acoustical interface (110) may comprise more than one microphone.

In some embodiments, the data processing component (151) implements an input interface selection mechanism to select either the optical (141) or the acoustical (111) input interface to receive input data.

In some embodiments the interface (181) comprises a data communication interlace to exchange data with the removable security device. In some embodiments the removable security device (102) is a smart card and the data communication interface comprises a smart card reader for exchanging smart card commands and responses with the smart card. In some embodiments the removable security device (102) is adapted to generate a cryptogram and the data communication interface (181) of the first security device (101) is adapted to send a command to the second security device (102) to generate a cryptogram and to obtain from the second security device (102) the cryptogram generated in response to that command. In some embodiments the second security device (102) generates the cryptogram using a symmetric cryptographic algorithm and a secret key. In some embodiments the first security device (101) uses a cryptogram obtained from the second security device (102) when generating the security values. In some embodiments the first security device's (101) generating a security value comprises selecting bits from data obtained from the second security device (102). In some embodiments selecting bits from data obtained from the second security device (102) comprises selecting bits from a cryptogram generated by the second security device (102) and obtained by the first security device (101). In some embodiments the data processing component (151) is adapted to perform cryptographic operations when generating the security values, whereby the cryptographic operations involve a cryptographic key that is derived from data generated by the second security device (102) and obtained by the first security device (101). In some embodiments these cryptographic operations comprise generating a MAC (Message Authentication Code) over transaction data input into the first security device (101).

In some embodiments the first security device (101) is adapted to: communicate with a smart card (102), to send a smart card command to the smart card (102) instructing the smart card (102) to generate a cryptogram using a symmetric cryptographic algorithm with a secret key stored on the smart card (102) and a counter stored and maintained on the smart card (102), to receive from the smart card (102) that cryptogram generated by the smart card (102), to derive a symmetric key from that received cryptogram, to use that derived symmetric key to generate a MAC over a set of transaction related data, to transform the MAC into a dynamic security value and to present that dynamic security value to the user by means of output interface (131). In some embodiments the first security device (101) receives at least one of the set of transaction related data through the acoustical input interface (111).

In some embodiments an authentication token (100/101) comprises an acoustical interface (110/111) which includes a demodulation circuit that is adapted to demodulate two or more modulated carriers at the same time. The demodulation circuit may for example comprise a plurality of demodulation circuits that are each capable of demodulating a modulated carrier at a certain carrier frequency. In some embodiments the demodulation circuit provides two or more demodulated data streams to a data processing component (150/151) of the authentication token (100/101) for further processing.

In some embodiments authentication token (100/101) comprises an acoustical interface (110/111) which includes a demodulation circuit that is capable of demodulating a single modulated carrier at a time. In some embodiments the demodulation circuit can be tuned to a plurality of different carrier frequencies. In some embodiments the authentication token (100/101) tries to receive and demodulate at any given time at most one modulated carrier. In some embodiments the authentication token is adapted to select a carrier frequency from a plurality of possible carrier frequencies for the carrier to demodulate. In some embodiments the authentication token, when put in receiving mode, selects one carrier frequency from a plurality of possible carrier frequencies and tries to receive a message by trying to receive and demodulate a modulated carrier on the selected carrier frequency. In some embodiments the authentication may select at some point in time another carrier frequency than the initially selected frequency and try to receive and demodulate a modulated carrier on the newly selected carrier frequency. In some embodiments this may happen in response to certain conditions being met. These conditions may for example comprise not having been able to successfully receive and demodulate a modulated carrier at the selected frequency within a certain time limit, or detecting insufficient power in a frequency band centred on the selected carrier frequency, or not having been able to detect a specific lead sequence or a specific piece of signal within a certain time limit. Such a specific lead sequence or a specific piece of signal may comprise for example a specific sequence of symbols or a specific wave form or a piece of signal comprising the unmodulated carrier for a certain amount of time. In some embodiments these conditions are being tested continuously. In other embodiments these conditions are being tested only from time to time.

In some embodiments the initial carrier frequency that the authentication token uses when entering receiving mode is a constant parameter. In some embodiments the initial carrier frequency that the authentication token uses when entering receiving mode is the last successfully used carrier frequency. In some embodiments the authentication token is adapted to store performance metrics for the various possible carrier frequencies and to select the initial frequency based on these stored performance metrics. In some embodiments these stored performance metrics are based on past performances. For example they may be based on the relative success ratio of the various possible frequencies during recent attempts to receive data. In some embodiments the initial frequency that the authentication token tries to use in reception mode is selected based on dynamic tests. In some embodiments these tests may include measuring the signal power in frequency bands centred on each of the possible carrier frequencies. In some embodiments the carrier frequency with the highest power measured in a frequency band centred on it is selected as the initial carrier frequency.

In many embodiments the authentication token (100/101) is a relatively small and light device. In many embodiments it may be a handheld and portable device. For example it may be less than 10 centimeters long, less than 2 centimeters thick and less than 7 centimeters wide. The authentication token (100/101) may for example weigh less than 100 gram.

In many embodiments the authentication token (100/101) comprises an autonomous power supply. It may for example comprise one or more batteries. In some embodiments the batteries may be removable.

Figure 3:
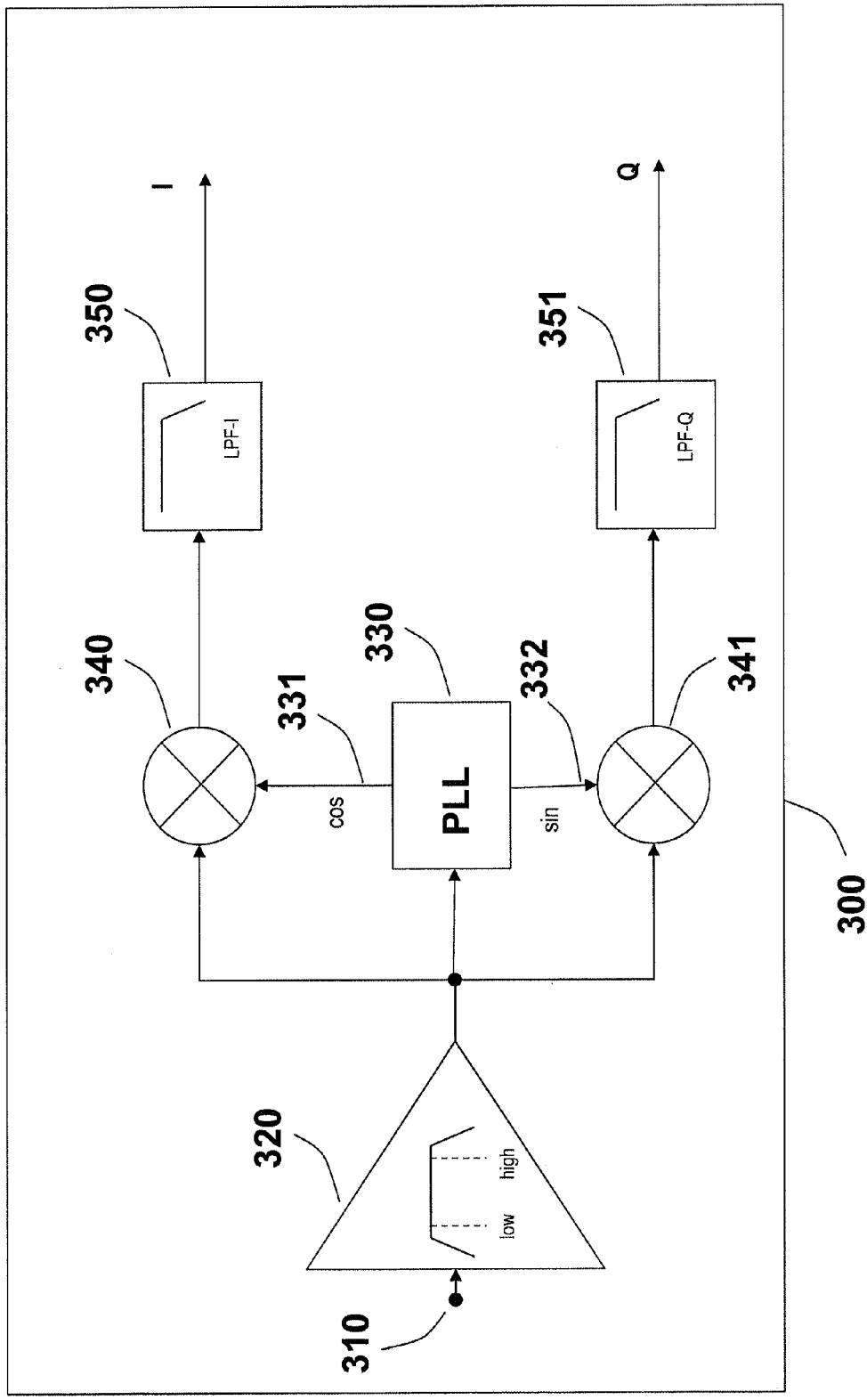
FIG. 3 schematically illustrates a demodulation circuit according to an aspect of the invention.

FIG. 3 schematically illustrates a demodulation circuit (300) according to an aspect of the invention.

The demodulation circuit (300) may for example be used to demodulate BPSK modulated acoustic signals.

In one embodiment an input node (310) of the demodulation circuit (300) is connected to a microphone that receives an acoustical signal. Optionally the demodulation circuit (300) includes a pre-amplifying component (320) which selectively amplifies the input signal at input node (310). The optionally selectively amplified input signal is fed to each of the mixing components (340 & 341). The phase-locked loop (330) (PLL) is tuned to a selected carrier frequency and generates two reference signals. One of the reference signals (331) has the same frequency and phase as the carrier frequency. This reference signal (331) is provided to mixing component (340) which mixes reference signal (331) with the band-pass filtered input signal. The output of the mixing component (340) is low-pass filtered by low-pass filter (350) which removes the double frequency component from the output of the mixing component (350). As a result the output of low-pass filter (350) comprises a base-band signal containing input data which can be converted to a digital signal with a Digital-to-Analog Converter (not shown on the figure) and fed to a data processing component. The other reference signal (332) has the same frequency as the carrier frequency but is phase shifted by 90 degrees. This reference signal (332) is provided to mixing component (341) which mixes reference signal (332) with the band-pass filtered input signal. The output of the mixing component (341) is low-pass filtered by low-pass filter (351). The output of low-pass filter (351) is the PLL offset.

In some embodiments the pre-amplifying component (320) includes a band-pass filter. In some embodiments the pre-amplifying component (320) includes an auto-gain control functionality.

In some embodiments the cut-off frequency of the low-pass filter (350) and/or low-pass filter (351) is more or less at the assumed baud rate of the input signal. In some particular embodiments the cut-off frequency of the low-pass filters (350) and/or low-pass filter (351) is less than twice the assumed baud rate of the input signal.

In some embodiments the phase-locked loop (330) has a very small capture range around the selected carrier frequency. It works on a more or less fixed selected carrier frequency and only very small deviations are possible to ensure phase lock to that selected carrier frequency.

In some embodiments the phase-locked loop includes a digital phase-locked loop. In some embodiments the phase-locked loop includes a numerical controlled oscillator.

In some embodiments an authentication token in accordance to an aspect of the invention may comprise a demodulation circuit (300) that can be used to modulate more than one carrier frequency. In some embodiments the demodulation circuit (300) can be tuned to various carrier frequencies. In some embodiments an authentication token comprises a separate demodulation circuit (300) for each different carrier frequency. In some embodiments the demodulation circuits (300) may be narrowly tuned to a single fixed carrier frequency.

Figure 4:
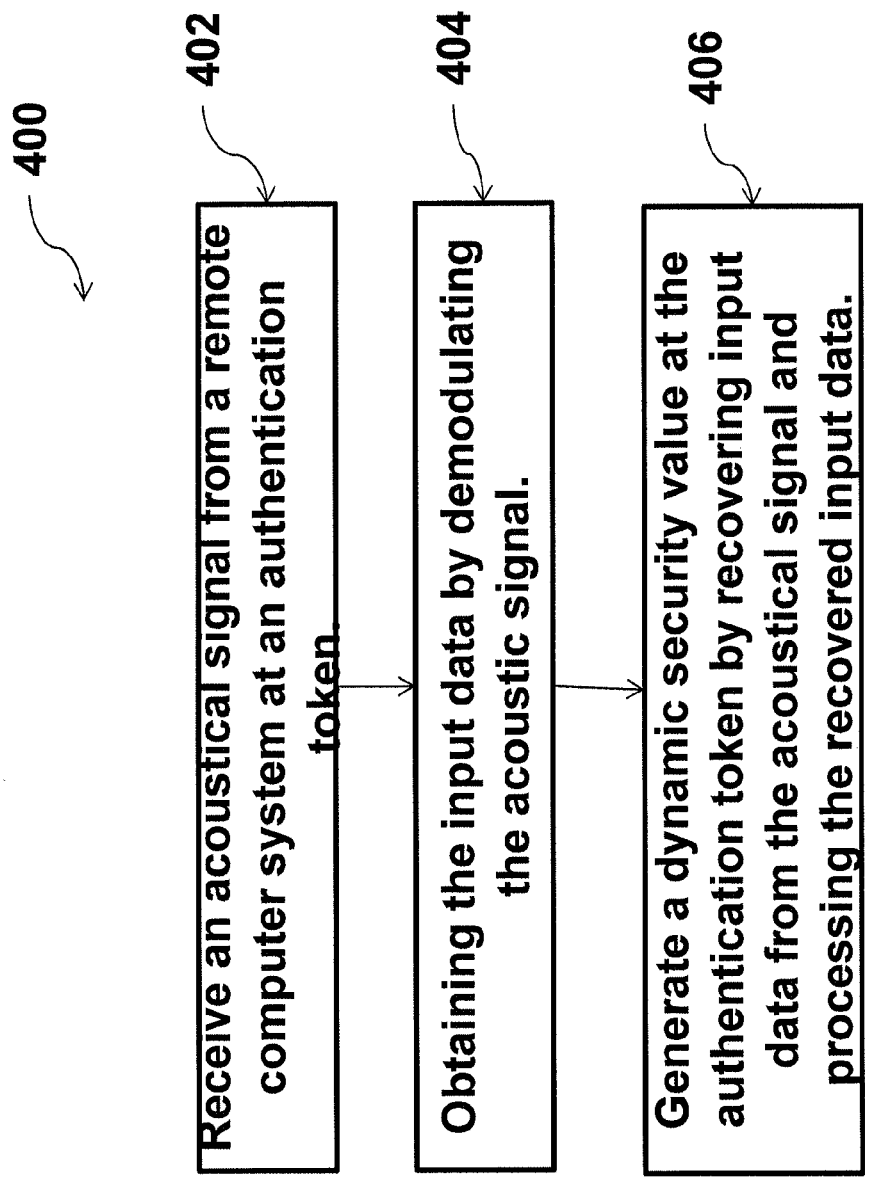
FIG. 4 is a flow chart depicting a strong authentication method for use with an authentication token according to an aspect of the present invention.

FIG. 4 depicts a flowchart 400 of steps for use with a strong authentication token (100/101) to generate strong security values. Although, the steps of flow chart 400 are described below with reference to the apparatus of FIGS. 1-3, it will be understood by one of skill in the art from the description herein that the method may be performed using other apparatus without departing from the scope of the present invention.

At block 402, an acoustical signal including input data is received from a remote computer system. The acoustical signal may be received at an authentication token 100/101 from a computer system such as a PC, a Tablet Computer, or a Smartphone, or some other computing/processing device with which the user interacts e.g. to access a remote application over e.g. the internet. The authentication token (100/101) may be one of the authentication tokens with an acoustical input interface (111) described in any of the preceding paragraphs. The input data may include data used for authentication/validation such as a challenge, transaction data, or server credentials.

At block 404, input data is obtained by demodulating the acoustic signal. The acoustical signal may be demodulated using demodulation circuit 300.

At block 404, the dynamic security values are generated. The dynamic security values may be generated at the authentication token (100/101) as described in any of the preceding paragraphs. The dynamic security value may be generated at the authentication token 100/101 by recovering input data from the demodulated acoustical signal and processing the recovered input data with data processing component 150/151. The authentication token 100/101 may include a communication interface (182) for communicating with a removable security device (102) such as a smart card and the generating step may include generating the dynamic security value with the authentication token (100/101) in cooperation with the removable security device (102). The authentication method may additionally include receiving an optical signal including additional input data and the generating step may include combining the recovered input data and the additional input data.

Figure 5:
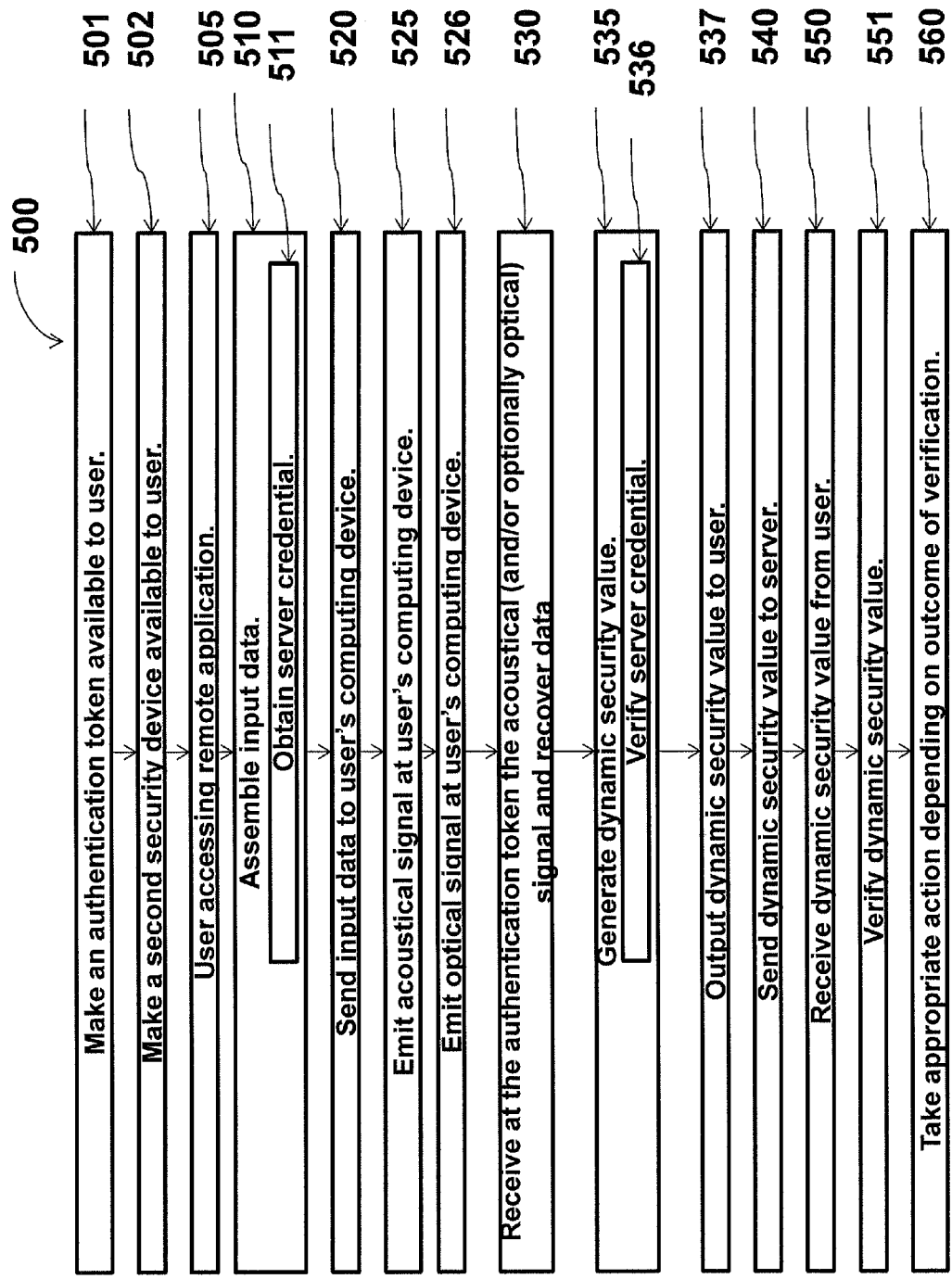
FIG. 5 is a flow chart depicting a method according to an aspect of the invention to secure a user's access to a remote application.

FIG. 5 illustrates various steps of a method (500) according to an aspect of the invention to secure a user's access to a remote application. In some embodiments some steps may be performed in a different order than described here. In some embodiments some steps may be omitted. In some embodiments extra steps may be performed.

In step 501 an authentication token with an acoustical input interface (such as one of the authentication tokens (100/101) described in any of the preceding paragraphs) is made available to a user. In (optional) step 502 also a removable second security device (102) such as a smart card (which may be a financial card compliant with the EMV standard) is made available to the user e.g. to be used in conjunction with the authentication token (100/101) (in which case the authentication token (100/101) may comprise a communication interface to communicate with the second security device (102)).

In step 505 the user is accessing the remote application (hosted by an application server) from a computing device (such as a PC, Tablet Computer or Smartphone) e.g. over a communication network which may comprise for example a (computer) network such as the Internet or a (mobile) telephone network and using for example a web browser running on the computing device. In some embodiments this step may comprise the user supplying transaction related data to the remote application.

In step 510 an application or application server assembles input data. The input data may for example comprise a challenge or transaction related data or transaction context related data or a server credential. In the (optional) sub-step 511 the application or application server generates the server credential.

In step 520 the application or application server sends the input data (for example embedded in one or more web pages) to the user's computing device that the user is using to access the remote application e.g. over the Internet.

In some embodiments all or part of the input data may be assembled by the user's computing device. For example, in some embodiments the user supplies transaction related data to the user's computing device in step 505. The user's computing device may then on the one hand forward these transaction related data to the application server and on the other hand assemble the input data which may consist of or comprise the transaction related data.

In step 525 the user's computing device is made to emit a modulated acoustical signal that encodes the input data. The step of encoding an acoustical signal with the input data may (partly) be done by the application server and/or (partly) be done by the user's computing device. For example in some embodiments the application server may assemble the input data and may encode a digitized acoustical signal. The application server may send the digitized acoustical signal to the computing device (e.g. in the form of an audio file such as a WAV file) and the computing device may playback this digitized acoustical signal on its loudspeaker(s). In other embodiments the user's computing device may obtain the input data as described above (e.g. from the application server or from the user) and encode a digitized acoustical signal with these input data and then playback this digitized acoustical signal on its loudspeaker(s).

In (optional) step 526 the user's computing device is made to emit an optical signal that encodes data. In some embodiments the data encoded in the optical signal comprises part or all of the data encoded in the acoustical signal.

In step 530 the acoustical token (100/101) receives the acoustical and/or the optical signal and recovers the data encoded in the acoustical and/or optical signal.

In step 535 the acoustical token (100/101) generates a dynamic security value. The authentication token (100/101) may generate the dynamic security value as described in any of the preceding paragraphs. In some embodiments the acoustical token (100/101) may use data recovered from the acoustical and/or the optical signal for the generation of the dynamic security value. In step 536 the authentication token (100/101) verifies a server credential comprised in the data recovered from the acoustical and/or the optical signal. In some embodiments the generation of the dynamic security value is conditional on the successful verification of the server credential. In step 537 the authentication token (100/101) outputs the generated dynamic security value to the user.

In step 540 the user sends the generated dynamic security value to the application or application server, for example by typing the digits making up the dynamic security value into a form field of a web page of the application.

In step 550 the application or application server receives the dynamic security value. In step 551 the application or application server verifies the received dynamic security value. This verification may happen as described in some of the preceding paragraphs.

In step 560 the application or application server takes appropriate action which depends on the outcome of the verification of the received dynamic security value, as described in some of the preceding paragraphs.

Figure 6:
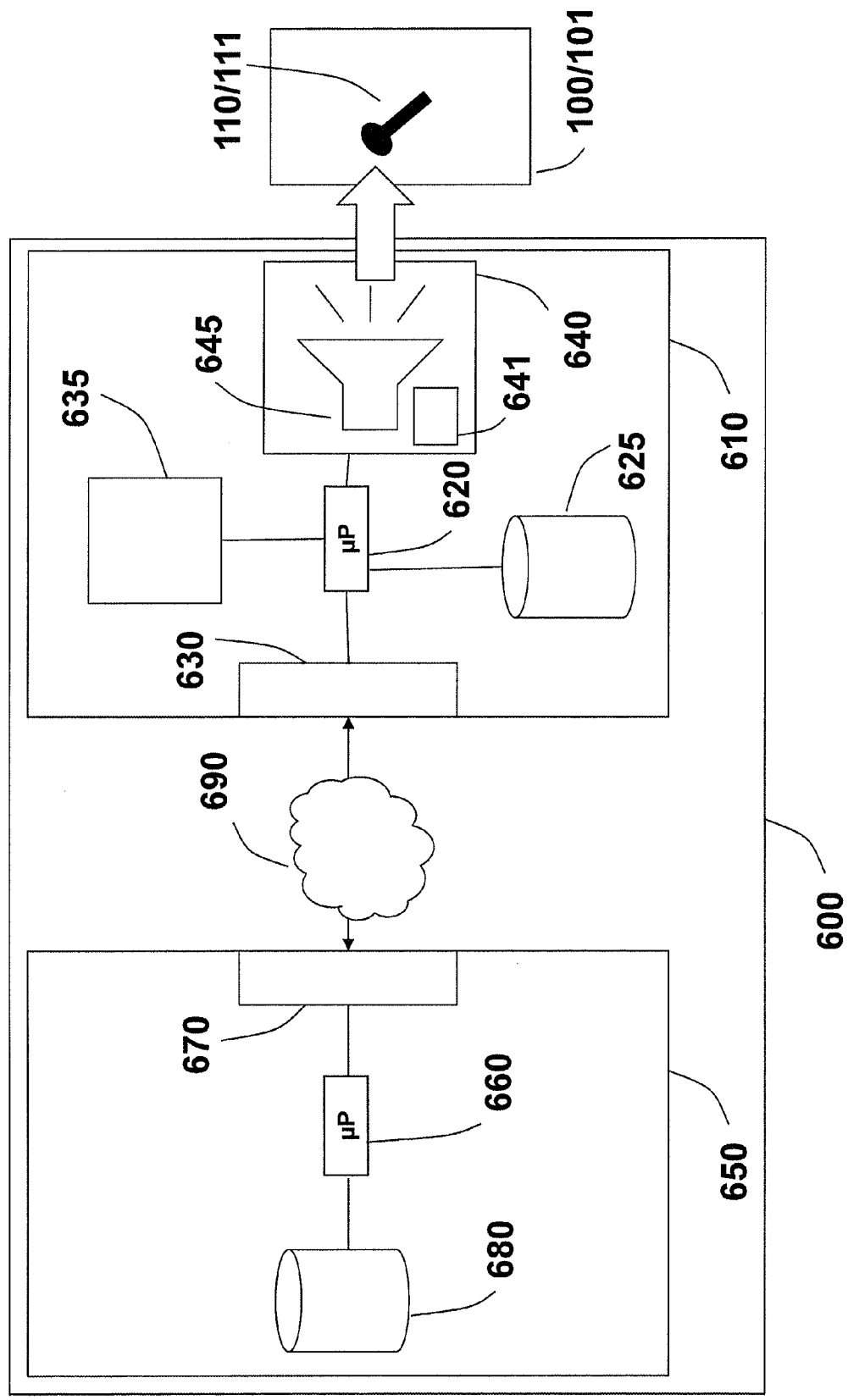
FIG. 6 illustrates a system for transmitting input data to an authentication token having an acoustical input interface according to an aspect of the invention.

FIG. 6 illustrates a system (600) for transmitting data to an authentication token (100/101) having an acoustical input interface (110/111). The system (600) comprises a user's computing device (610). The system may also comprise a server computer system (650).

The user's computing device (610) may comprise a data processing component (such as for example a microprocessor) (620), one or more data storage components (625) which may comprise RAM memory and/or one or more hard disk(s), a communication interface (such as an Ethernet card) (630) to communicate with a server computer system (650) over a computer network (such as the internet) (690), a user interface (635) to receive information from and output information to a user (such as for example a display, keyboard and/or mouse), an acoustical output interface (640) for emitting sound in the audible frequency range. The acoustical output interface (640) may comprise one or more sound cards (641), one or more Digital-to-Audio Converters, one or more amplifiers and one or more loudspeakers (645). The user's computing device (610) may comprise a sound playback software application (such as Windows Media Player, or RealPlayer) for playing audio files. The user's computing device (610) may comprise for example a Personal Computer (PC), a laptop, a Smartphone, a Personal Digital Assistant (FDA) or a tablet computer.

The server computer system (650) may comprise one or more data processing components (such as for example one or more microprocessors) (660), one or more communication interfaces (such as an Ethernet card) (670) to communicate with one or more users' computing devices (610) over a computer network (such as the internet) (690), one or more data storage components (680) which may comprise RAM memory and/or one or more hard disk(s) and/or one or more databases.

Figure 7:
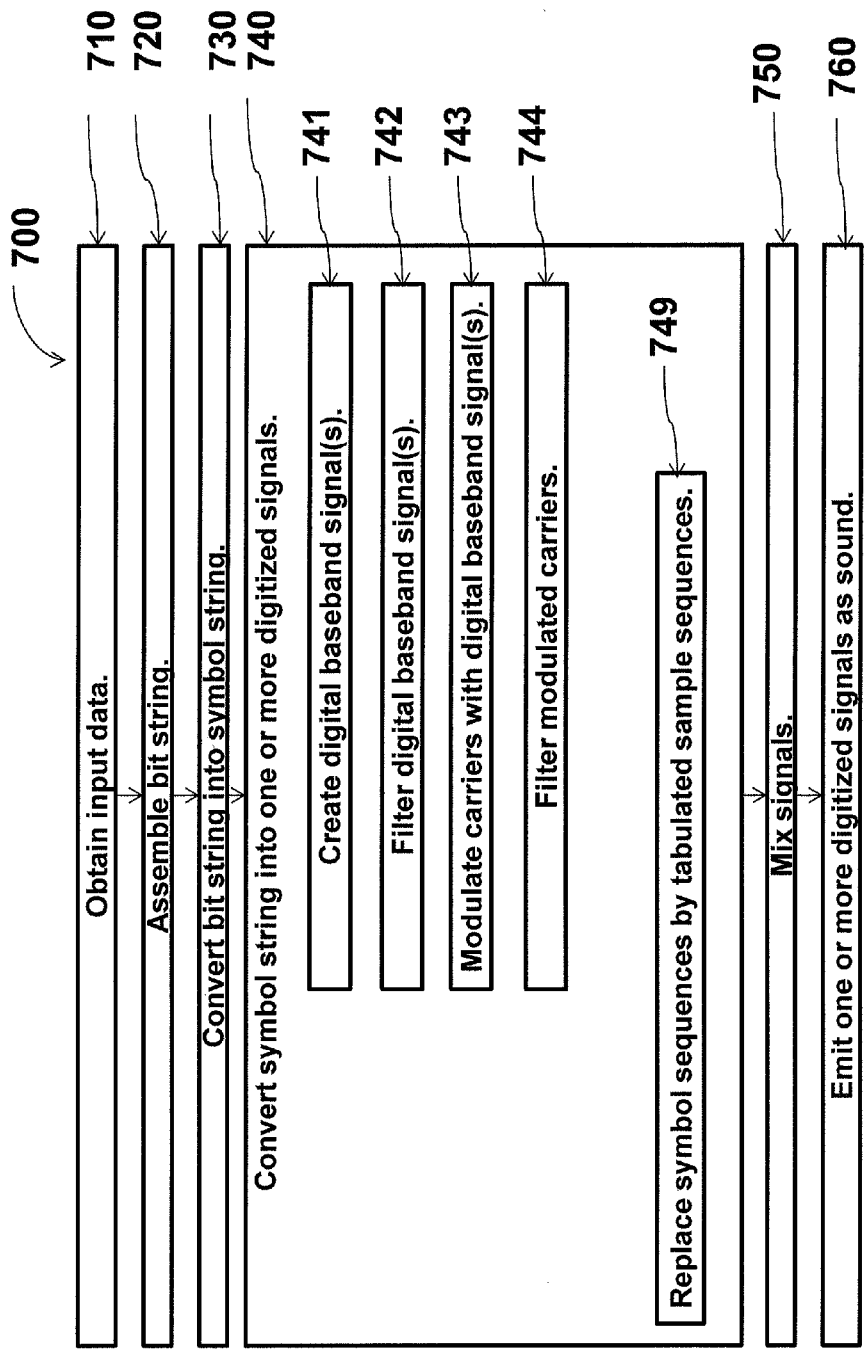
FIG. 7 illustrates a method for transmitting input data to an authentication token having an acoustical input interface according to an aspect of the invention.

FIG. 7 illustrates a method (700) for transmitting input data to an authentication token (100/101) having an acoustical input interface (110/111). In some embodiments some steps may be performed in a different order than described here. In some embodiments some steps may be omitted. In some embodiments extra steps may be performed.

In step 710 input data to be transmitted to the authentication token (100/101) are obtained. This step may comprise for example obtaining a challenge value (which may be a random value) and/or transaction related data (which may be supplied by the user). In some embodiments the input data may comprise other types of data such as configuration data for the token. In some embodiments the input data may comprise a server credential (such as for example a dynamic password or a signature over all or part of the input data) for authenticating the server or the originator of the input data to the token or for protecting the integrity and/or confidentiality of part or all of the input data.

In step 720 a bit string is assembled which encodes the input data. This step may comprise any of formatting the input data, adding tags, putting the input data into data field structures, concatenating data or data fields, adding padding bits or bytes, cryptographic operations such as encrypting, hashing and/or signing, adding error detection and/or correction codes, bit stuffing, or similar operations.

In step 730 the bit string may be converted into a string of symbols. In some embodiments only two symbols are being used. In other embodiments more than two symbols are being used.

In step 740 the symbol string is converted into one or more digitized acoustical signals. In some embodiments the one or more digitized acoustical signals are formatted into a standard audio file format such as for example the Waveform Audio File Format (WAVE or WAV) file format. In some embodiments other audio file formats may be used, such as for example MP3. This step may comprise a number of sub-steps.

In some embodiments these sub-steps may comprise creating (741) one or more digital baseband signals. In some embodiments each digital baseband signal represents the same symbol string. In some embodiments more than one baseband signals are created whereby the different baseband signals are created using symbol strings that encode the input data in a different way or a different format. In some embodiments a standard sampling frequency is used to create the one or more digital baseband signals such as for example 8000 Hz, 11025 Hz, 22050 Hz or 44100 Hz.

In some embodiments these sub-steps may (optionally) comprise digitally pre-filtering (742) at least some of the one or more digital baseband signals. In some embodiments this pre-filtering may comprise root-raised-cosine (RRC) filtering or square-root-raised-cosine (SRRC) filtering.

In some embodiments these sub-steps comprise modulating (743) at least two carriers with different carrier frequencies with the one or more digital baseband signals. These carrier frequencies may have been selected as explained in the preceding paragraphs. The carriers may be modulated as explained in the preceding paragraphs. In some embodiments the carriers are Binary Phase Shift Keying (BPSK) modulated.

In some embodiments all modulated carriers have the same baud rate. In some embodiments there is a fixed ratio between the baud rate and the carrier frequency for at least two of the carriers. In some embodiments there is a fixed ratio between the baud rate and the carrier frequency for all carriers. In other embodiments the baud rate is the same for at least two of the carriers. In some embodiments the baud rate is the same for all carriers.

In some embodiments the same baseband signal is used to modulate at least two carriers. In some embodiments the same baseband signal is used to modulate all carriers. In some embodiments a different modulating baseband signal is used for each carrier.

In some embodiments these sub-steps comprise filtering (744) one or more of the modulated carriers. In some embodiments this filtering of the modulated carriers may comprise applying a band-pass filter. In some embodiments the band-pass filter may be centred on the carrier frequency of the modulated carrier. In some embodiments the band-pass filter may comprise a Finite Impulse Response (FIR) filter. In some embodiments the band-pass filter may be tuned to suppress the power in the side lobes of the frequency spectrum of the modulated carrier.

In some other embodiments the step 740 of converting the symbol string into one or more may comprise the sub step of replacing (749) symbols or sequences of symbols by sequences of samples that are retrieved from a table that lists various sequences of samples as a function of the symbol or sequence of symbols they are meant to replace. In some embodiments this sub-step may for example replace the sub-steps 741 and 742. In other embodiments this sub-step may for example replace sub-steps 741, 742 and 743. In still other embodiments this sub-step may for example replace sub-steps 741, 742, 743 and 744.

In some embodiments at least two modulated carriers, which may have been band-pass filtered, are mixed (750) into a single digitized signal. in some embodiments all modulated carriers, which may have been band-pass filtered, are mixed into a single digitized signal. In other embodiments at least two modulated carriers are retained as separate digitized signals.

In some embodiments the one or more resulting digitized signals that each comprise one or more modulated carriers are converted into an analog signal and emitted as sound (760). In some embodiments at least two modulated carriers are emitted as sound separately one after the other. In some embodiments at least two modulated carriers are emitted as sound at the same time but separately over different loudspeakers (645). In some embodiments at least two modulated carriers are mixed and emitted as sound together at the same time over the same loudspeaker (645).

In some embodiments all modulated carriers are given the same power. In some embodiments at least one modulated carrier is given more power than at least one other modulated carrier. In some embodiments the power difference is 6 dB.

In some embodiments the user's computing device (610) comprises a sound card (641) and one or more loudspeakers (645) connected to the sound card (641), and the user's computing device (610) supplies the samples of the one or more digitized signals to the sound card (641) to be emitted by the one or more loudspeakers (645). In some embodiments the samples of the one or more digitized signal(s) are fed directly to the sound card (641). In other embodiments an intermediate audio vile (e.g. a WAVE file) is used containing the samples plus a header.

In some embodiments emitting the digitized signals is repeated a fixed number of times. In some embodiments emitting the digitized signals is repeated an indefinite number of times. In some embodiments emitting the digitized signals is repeated until an indication is given or received that the authentication token (100/101) has correctly received the transmitted data. For example, in some embodiments the user's computing device (610) repeats emitting the digitized signals until the user cancels the operation or until the user has provided to the user's computing device (610) a dynamic password or signature that has been generated by the authentication token (100/101) in response to the transmitted data. In some embodiments the user's computing device (610) repeats emitting the digitized signals until an indication is given or received that a different method is to be used to transmit the data to the authentication token (100/101). For example in some embodiments the user may indicate to the user's computing device (610) that the data has to be transmitted optically instead of acoustically or that the user intends to enter the data manually into the authentication token (100/101).

In some embodiments some of the steps of transmitting input data to an authentication token (100/101) having an acoustical input interface (110/111) are performed by the user's computing device (610). In some embodiments some of the steps of transmitting input data to an authentication token (100/101) having an acoustical input interface (110/111) are performed by a server (650) that communicates with the user's computing device (610) over a computer network such as for example the internet. In some embodiments all steps are performed by the user's computing device (610). In some embodiments some steps are performed by a server (650) and other steps are performed by the user's computing device (610). For example, in some embodiments a server (650) obtains the input data and sends the obtained input data to the user's computing device (610) e.g. over the Internet embedded in a web page, and the user's computing device (610) receives the input data and performs all the subsequent steps to obtain a digital signal encoding the input data over multiple modulated carriers and emits these modulated carriers as sound to be received by the acoustical token (100/101). In other embodiments a server (650) obtains the input data and generates one or more digitized signals comprising at least two modulated carriers encoding the input data and sends the one or more digitized signals to the user's computing device (610) e.g. over the Internet embedded in a web page and/or in the format of an audio file, and the user's computing device (610) receives the one or more digitized signals and emits the one or more digitized signals as sound to be received by the acoustical token (100/101).

Figure 8:
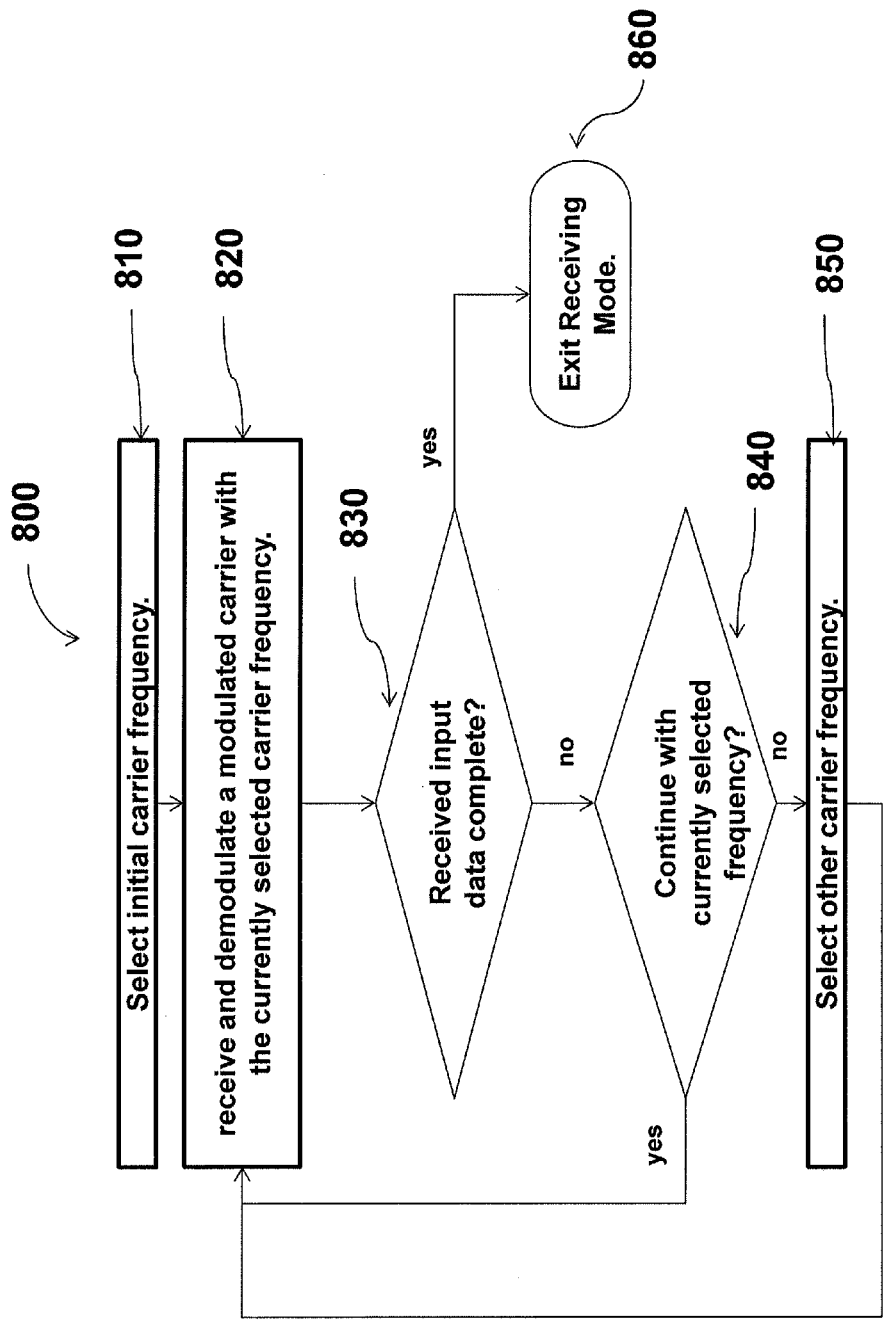
FIG. 8 illustrates a method for an authentication token (having an acoustical input interface to acoustically receive data.

FIG. 8 illustrates a method (800) for an authentication token (100/101) having an acoustical input interface (110/111) to acoustically receive data. In some embodiments some steps may be performed in a different order than described here. In some embodiments some steps may be omitted. In some embodiments extra steps may be performed.

In step 810 the authentication token (100/101) may enter receiving mode and select an initial carrier frequency. This step may comprise actions explained in some of the preceding paragraphs. In some embodiments the initial carrier frequency is a constant parameter. In some embodiments the initial carrier frequency is selected on the basis of dynamic tests which may comprise measuring the relative power in frequency bands centred on each of a number of candidate carrier frequencies and for example selecting the frequency with the most power. In some embodiments the selection of the carrier frequency may include performing an estimate of the signal-to-noise ratio and for example selecting the carrier frequency with the smallest signal to noise ratio. In some embodiments the carrier frequency is selected based on past performance measures associated with the various candidate frequencies. In some embodiments the initial carrier frequency is the last successfully used carrier frequency.

In step 820 the authentication token (100/101) may try to receive and demodulate a modulated carrier with the currently selected carrier frequency. This step may comprise actions explained in some of the preceding paragraphs. In some embodiments this step may comprise tuning a demodulation circuit to the currently selected carrier frequency. In some embodiments this step may comprise tuning a PLL to the currently selected carrier frequency. In some embodiments this step may comprise tuning a filter to the currently selected carrier frequency. In some embodiments this step may comprise mixing or multiplying the received signal with a generated carrier of the currently selected carrier frequency.

In step 830 the authentication token (100/101) may test whether the demodulated data comprises a complete set of correctly received input data. If that is the case the token (100/101) may exit (860) the reception mode. If, on the other hand, that is not the case the token (100/101) may continue with the various steps of the reception method. This step may happen in parallel to other steps such as step 820 and/or step 840. In some embodiments this step may comprise verifying an error detection code. In some embodiments this step may comprise verifying the amount of received input data.

In step 840 the authentication token (100/101) may test certain conditions and may decide, based on the outcome of these condition tests, whether to continue with the currently selected carrier frequency or whether to select another carrier frequency instead. In some embodiments this step may happen in parallel to other steps such as step 820 and/or step 830. In some embodiments this step may comprise comparing to some threshold the amount of time that has elapsed since the currently selected carrier frequency has been selected. In some embodiments this step may comprise verifying the power in a frequency band centred on the currently selected carrier frequency. In some embodiments this step may comprise verifying a measure indicative of the error rate of the received data or an estimate of the signal-to-noise ratio.

In step 850 the authentication token (100/101) may select an alternative carrier frequency and return to step 820 to try to receive and demodulate a modulated carrier with the newly selected alternative carrier frequency. This step may comprise actions explained in some of the preceding paragraphs. For example, in some embodiments the alternative carrier frequency is selected on the basis of dynamic tests which may comprise measuring the relative power in frequency bands centred on each of a number of candidate carrier frequencies and for example selecting the frequency with the most power. In some embodiments the selection of the alternative carrier frequency may include performing an estimate of the signal-to-noise ratio and for example selecting the carrier frequency with the smallest signal to noise ratio. In some embodiments selecting a new carrier frequency may comprise taking into account past performance measures associated with the various candidate frequencies. In some embodiments selecting a new carrier frequency may comprise excluding carrier frequencies that have already been tried unsuccessfully. In some embodiments the carrier frequencies are weighted for selection with carrier frequencies that have already been tried unsuccessfully receiving a relatively low weight and carrier frequencies that have not been tried or have been tried successfully receiving a relative high weight. Relatively high weighted carrier frequencies are preferentially selected over relatively low weighted carrier frequencies, which may be excluded from selection. In some embodiments the authentication token cycles through a list of possible carrier frequencies. In some embodiments the order of the supported carrier frequencies in this list is a constant parameter of the token.

In a typical embodiment the acoustical token (100/101) is in the local vicinity of the one or more loudspeakers (645) of the user's computing device (610) that acoustically emit the sound signal carrying the input data that have been redundantly encoded on at least two carrier frequencies. The air between the one or more loudspeakers (645) of the user's computing device (610) acts and the acoustical token's (100/101) one or more microphones (110/111) act as transmission medium. In many embodiments the one or more microphones (110/111) have a weak directional relative sensitivity so that the exact orientation and position of the acoustical token (100/101) relative to the orientation and position of the one or more loudspeakers (645) of the user's computing device (610) is usually not critical for successful reception of the data. In many embodiments the acoustical token (100/101) may be held at a distance of the user's computing device's (610) one or more loudspeakers (645) that may vary from as little as a couple of centimeters to as much as several meters.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature of the present invention may have been disclosed with respect to only one of several implementations, such feature may be combined with one or more other features of the other implementations as may be desired and advantageous for any given or particular application. While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. Thus, the breadth and scope of the present invention should not be limited by any of the above described exemplary embodiments but should be defined only in accordance with the following claims and their equivalents.

The invention claimed is:

1. A strong authentication token for generating dynamic security values comprising:
   a trustworthy user output interface for communicating generated dynamic security values to a user;
   an acoustical input interface for acoustically receiving input data, the acoustical interface comprising at least one microphone and a demodulation circuit connected to the at least one microphone configured to demodulate an acoustical signal received by the microphone, the acoustical signal modulated using at least one of amplitude shift keying (ASK), phase shift keying (PSK), quadrature amplitude modulation (QAM), or binary phase shift keying (BPSK); and a data processing component connected to or comprised in the demodulation circuit, the data processing component configured to recover input data transmitted in the received acoustical signal after the acoustical signal is demodulated by the demodulation circuit, to process the recovered input data, and to generate the dynamic security values, the demodulation circuit tuneable by the token to a chosen carrier frequency and said chosen carrier frequency selectable by the token from any of at least two different possible carrier frequencies.

2. The token of claim 1, wherein the demodulation circuit is configured to demodulate at the same time at least two modulated carriers having different carrier frequencies.

3. The token of claim 1, configured to select a different value for said chosen carrier frequency than the currently chosen carrier frequency if certain conditions are met.

4. The token of claim 3 wherein said conditions comprise the token not having been successful to correctly receive said input data within a given time limit.

5. The token of claim 1 wherein the initial value for said chosen carrier frequency is a constant parameter of the token.

6. The token of claim 1 wherein the initial value for said chosen carrier frequency that is selected when the token enters receiving mode is the last successfully used carrier frequency.

7. The token of claim 3 configured to select said chosen carrier frequency by cycling through a fixed list of candidate frequencies.

8. The token of claim 7 wherein the order of said list is a constant parameter of the token.

9. The token of claim 3 configured to select said chosen carrier frequency from a list of possible carrier frequencies by taking into account past performance measures associated with the possible carrier frequencies.

10. The token of claim 3 configured to select said chosen carrier frequency by taking into account the measured values of metrics related to at least some of said possible carrier frequencies.

11. The token of claim 3 configured to select said chosen carrier frequency by taking into account the power in frequency bands centred on at least some of said possible carrier frequencies.

12. The token of claim 3 configured to select said chosen carrier frequency by taking into account estimates or measurements of the error rate for at least some of said possible carrier frequencies.

13. The token of claim 3 configured to select said chosen carrier frequency by taking into account estimates or measurements of the signal-to-noise ratio for at least some of said possible carrier frequencies.

14. The token of claim 1, further comprising a data storage component for storing secrets shared with a server and wherein said data processing component is further configured to generate said security values using at least one of said secrets.

15. The token of claim 14, wherein the data processing component is further configured to generate said security values by cryptographically combining at least one of said secrets with a dynamic variable.

16. The token of claim 15, wherein the cryptographically combining comprises performing a symmetric cryptographic algorithm.

17. The token of claim 15, wherein the dynamic variable comprises a time value.

18. The token of claim 15, wherein the dynamic variable comprises a counter value.

19. The token of claim 15, wherein the dynamic variable comprises a challenge value.

20. The token of claim 15, wherein the dynamic variable comprises a transaction data related value.

21. The token of claim 1, further comprising a compact manual user input interface, the compact manual user input interface comprising a navigation mechanism and a confirmation mechanism.

22. The token of claim 21, wherein the navigation mechanism comprises at least one navigation button and the confirmation mechanism comprises at least one confirmation button.

23. The token of claim 22, wherein the navigation mechanism consists of two navigation buttons and the confirmation mechanism consists of two buttons including an 'OK' button.

24. The token of claim 21, wherein the navigation mechanism comprises a scroll wheel.

25. The token of claim 1, wherein the token is a first security device and wherein the token further comprises a communication interface configured to communicate with a removable second security device and wherein the token is configured to generate the dynamic security values in cooperation with the second security device.

26. The token of claim 25, in which the removable second security device comprises a smart card.

27. The token of claim 25, wherein the token is configured to generate at least one of the dynamic security values by sending a command to the second security device and deriving the at least one dynamic security value from the response of the second security device to said command.

28. The token of claim 27, wherein the token is configured to include a challenge in said command and wherein response of the second security device is calculated by the second security device as a function of said challenge.

29. The token of claim 27, wherein the response by the second security device comprises a cryptogram that is calculated by the second security device by cryptographically combining a secret stored by the second security device with a counter value stored and maintained by the second security device using a symmetric cryptographic algorithm.

30. The token of claim 29, wherein the token is further configured to derive a cryptographic key from the response of the second security device and to generate the at least one dynamic security value by cryptographically combining said cryptographic key with at least one transaction data related value.

31. The token of claim 1, further comprising an optical input interface.

32. The token of claim 31, further comprising an interface selection mechanism to select either the acoustical input interface or the optical input interface to receive input data.

33. The token of claim 32, wherein the token is further configured to receive from the user an indication which of the acoustical input interface or the optical input interface the token should use.

34. The token of claim 32, wherein the interface selection mechanism is configured to determine by means of heuristic rules on the basis of certain characteristics of the signals received through the acoustic input interface and the optical input interface which input interface to select to receive data.

35. The token of claim 32, wherein the token is configured to apply a selection process which comprises trying for a first period of time to receive at least some data through a first one of the optical input interface or the acoustical input interface, and if the trying to receive at least some data during the first period of time is successful selecting the input interface being tried and continue receiving data through the selected input interface, and if the trying to receive at least some data during the first period of time is unsuccessful repeating the selection process with the other of the optical input interface or the acoustical input interface for a second period of time.

36. The token of claim 32, in which the token is further configured to detect transmission errors in the data received through the currently selected input interface and to return to selecting either the acoustical input interface or the optical input interface in case one or more pre-defined criteria concerning the detected transmission errors are met.

37. The token of claim 31, configured to concurrently receive data through both the optical input interface and the acoustical input interface.

38. The token of claim 31, further configured to combine data received through the optical input interface with data received through the acoustical input interface.

39. The token of claim 1, further comprising an optical user interface and a smart card interface to communicate with a standard credit card sized smart card, the data processing component further configured to generate transaction data signatures by generating a message authentication code (MAC) over transaction data input into the token through the acoustical input or optical input interface, the data processing component generates the MAC using a symmetric cryptographic algorithm with a secret key that is derived from a cryptogram generated by the smart card.

40. The token of claim 39, further comprising a manual user data input interface configured for the user to input a personal identification number (PIN) value and wherein the token is further configured to submit said PIN value to the smart card for verification prior to the smart card generating said cryptogram and to erase from memory any copy of the PIN value after the token has submitted said PIN value to the smart card for verification.

41. The token of claim 40, further comprising an interface selection mechanism to select either the acoustical or the optical input interface to receive input data.

42. The token of claim 1, wherein the input data comprise a server credential and wherein processing the token is further configured to verify said server credential.

43. The token of claim 42, wherein said generating of the dynamic security values is conditional upon said verifying of said server credential being successful.

44. The token of claim 42, further comprising a data storage component for storing secrets shared with a server and wherein said data processing component is further configured to verify said server credential using at least one of said secrets and a symmetric cryptographic algorithm.

45. The token of claim 1 further comprising a user input interface for capturing user input and further configured to:
present at least some of the input data to the user using the trustworthy user output interface,
capture the user's approval of the presented input data using the user input interface, generate a cryptographic signature over the approved input data using the data processing component, and
communicate the generated cryptographic signature to the user using the trustworthy user output interface.

46. A method for securing access by a user to a remote application, the method comprising:
making available to the user an authentication token comprising:
a trustworthy user output interface for communicating generated dynamic security values to a user;
an acoustical input interface for acoustically receiving input data, the acoustical interface comprising at least one microphone and a demodulation circuit connected to the at least one microphone configured to demodulate an acoustical signal received by the microphone, the acoustical signal modulated using at least one of amplitude shift keying (ASK), phase shift keying (PSK), quadrature amplitude modulation (QAM), or binary phase shift keying (BPSK); and
a data processing component connected to or comprised in the demodulation circuit, the data processing component configured to recover input data transmitted in the received acoustical signal after the acoustical signal is demodulated by the demodulation circuit, to process the recovered input data, and to generate the dynamic security values, the demodulation circuit tuneable by the token to a chosen carrier frequency and said chosen carrier frequency selectable by the token from any of at least two different possible carrier frequencies;
obtaining input data to be transmitted to the user's authentication token;
emitting at a user's computing device an acoustical signal that redundantly comprises at least two modulated carrier frequencies encoded with the input data for reception by the user's authentication token;
receiving from the user a dynamic security value generated by the user's authentication token wherein the authentication token generates and outputs to the user the dynamic security value after receiving and demodulating the acoustical signal and recovering the input data;
verifying the received dynamic security value; and
taking action depending on the outcome of verifying the received dynamic security value.

47. The method of claim 46 further comprising emitting at the user's computing device an optical signal encoding at least a part of the input data for reception by the authentication token.

48. The method of claim 46 further comprising the steps of obtaining a server credential and including the server credential in the input data, and wherein the server credential is being verified by the authentication token and wherein the generation of the dynamic security value is dependent on the verification of the server credential.

49. The method of claim 46 further comprising making available to the user a second security device, and wherein the authentication token comprises a communication interface to communicate with the second security device and wherein the authentication token generates the dynamic security device in cooperation with the second security device.

50. The method of claim 46 wherein the at least two modulated carrier frequencies are emitted one after the other.

51. The method of claim 46 wherein the at least two modulated carrier frequencies are emitted together.

52. The method of claim 51 wherein the carrier frequencies are chosen so that there is minimal overlap in the power spectra of the modulated carrier frequencies.

* * * * *